US012743752B2

(12) United States Patent
Bai et al.

(10) Patent No.: US 12,743,752 B2
(45) Date of Patent: Sep. 22, 2026

(54) IMAGE PROCESSING METHOD AND RELATED DEVICE

(71) Applicant: SAMSUNG ELECTRONICS CO., LTD., Suwon-si (KR)

(72) Inventors: Mengmeng Bai, Beijing (CN); Li Zuo, Beijing (CN); Wei Wen, Beijing (CN); Lei Cao, Beijing (CN); Xiansong Song, Beijing (CN); Jaekeun Na, Beijing (CN); Changwei Wang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 678 days.

(21) Appl. No.: 18/074,003

(22) Filed: Dec. 2, 2022

(65) Prior Publication Data

US 2023/0153965 A1 May 18, 2023

Related U.S. Application Data

(63) Continuation of application No. PCT/KR2022/017785, filed on Nov. 11, 2022.

(30) Foreign Application Priority Data

Nov. 12, 2021 (CN) ......................... 202111342435.0
Jul. 12, 2022 (CN) ......................... 202210821462.4

(51) Int. Cl.
*G06T 5/77* (2024.01)
*G06T 3/4046* (2024.01)
(Continued)

(52) U.S. Cl.
CPC .............. *G06T 5/77* (2024.01); *G06T 3/4046* (2013.01); *G06T 7/74* (2017.01); *G06T 11/40* (2013.01);
(Continued)

(58) Field of Classification Search
CPC ... G06T 5/77; G06T 2210/22; G06T 2210/12; G06T 2207/20084; G06T 2207/20081;
(Continued)

(56) References Cited

U.S. PATENT DOCUMENTS 12,190,484 B2 * 1/2025 Amirghodsi ............. G06N 3/09
2014/0112548 A1 4/2014 Huang et al.
(Continued)

FOREIGN PATENT DOCUMENTS

EP 3 084 718 B1 3/2019
KR 10-2336003 B1 12/2021

OTHER PUBLICATIONS

Communication issued Oct. 9, 2024 by the European Patent Office in European Patent Application No. 22893281.0.
(Continued)

*Primary Examiner* — John Villecco
*Assistant Examiner* — Alexander John Rodgers
(74) *Attorney, Agent, or Firm* — Sughrue Mion, PLLC

(57) ABSTRACT

Methods and apparatuses for performing image processing using artificial intelligence are provided. In an embodiment, an image processing method includes acquiring a target image based on an editing operation on an original image, performing a filling processing operation on the target image to obtain a first filled image including a first target region, identifying a target patch based on the first filled image, calculating a similarity value between the target patch and at least one patch related to the first filled image using a first artificial intelligence (AI) model, determining a target residual patch corresponding to the target patch based on the similarity value and generating a processing result image based on the target residual patch.

20 Claims, 31 Drawing Sheets

(51) Int. Cl.

| | |
|---|---|
| ***G06T 7/73*** | (2017.01) |
| ***G06T 11/40*** | (2006.01) |
| ***G06V 10/74*** | (2022.01) |
| ***G06V 10/77*** | (2022.01) |

(52) U.S. Cl.

CPC ........ *G06V 10/761* (2022.01); *G06V 10/7715* (2022.01); *G06T 2207/20021* (2013.01); *G06T 2207/20081* (2013.01); *G06T 2207/20084* (2013.01); *G06T 2210/12* (2013.01); *G06T 2210/22* (2013.01)

(58) Field of Classification Search

CPC ......... G06T 2207/20021; G06T 3/4046; G06T 11/40; G06T 7/74; G06V 10/761; G06V 10/7715

See application file for complete search history.

(56) References Cited

U.S. PATENT DOCUMENTS

| | | | | |
|---|---|---|---|---|
| 2016/0275708 | A1* | 9/2016 | Abdollahian | G06T 5/77 |
| 2018/0165798 | A1* | 6/2018 | Lin | G06T 5/77 |
| 2019/0080453 | A1* | 3/2019 | Song | G06T 7/73 |
| 2019/0114818 | A1* | 4/2019 | Lin | G06T 5/30 |
| 2019/0295227 | A1 | 9/2019 | Wang et al. | |
| 2019/0354847 | A1* | 11/2019 | Rasch | G06T 7/11 |
| 2019/0355102 | A1* | 11/2019 | Lin | G06T 5/77 |
| 2019/0371144 | A1* | 12/2019 | Shu | H04M 1/72418 |
| 2020/0202601 | A1 | 6/2020 | Lin et al. | |
| 2020/0226714 | A1 | 7/2020 | Duan et al. | |
| 2020/0302577 | A1* | 9/2020 | Nakagawa | G06T 5/70 |
| 2021/0042880 | A1 | 2/2021 | Pohl | |
| 2021/0110198 | A1* | 4/2021 | Rhodes | G06V 10/82 |
| 2021/0118146 | A1* | 4/2021 | Rhodes | G06N 3/045 |
| 2021/0150678 | A1 | 5/2021 | Yi et al. | |
| 2021/0183022 | A1 | 6/2021 | Wang et al. | |
| 2021/0217145 | A1* | 7/2021 | El-Khamy | G06T 7/20 |
| 2021/0342984 | A1 | 11/2021 | Lin et al. | |
| 2022/0058438 | A1* | 2/2022 | Prince | G06N 3/0464 |
| 2022/0189069 | A1* | 6/2022 | Bedi | G06T 9/001 |
| 2022/0366544 | A1* | 11/2022 | Kudelski | G06T 5/60 |
| 2024/0185396 | A1* | 6/2024 | Hatamizadeh | G06T 5/60 |

OTHER PUBLICATIONS

International Search Report (PCT/ISA/210) issued from the International Searching Authority on Feb. 15, 2023 to International Application No. PCT/KR2022/017785.

Written Opinion (PCT/ISA/237) issued from the International Searching Authority on Feb. 15, 2023 to International Application No. PCT/KR2022/017785.

Communication issued Jan. 13, 2026 by the European Patent Office in European Patent Application No. 22893281.0.

Communication issued Jun. 5, 2026 by the European Patent Office in European Patent Application No. 22893281.0.

Communication issued Jul. 3, 2026 by the European Patent Office in European Patent Application No. 22893281.0.

* cited by examiner

FIG. 3

| | | |
|---|---|---|
| 91 | 92 | 93 |
| 94 | 95 | 96 |
| 97 | 98 | 99 |

target region

| | | |
|---|---|---|
| 92 | 92 | 92 |
| 92 | 92 | 92 |
| 92 | 92 | 92 |

third image original image result extracted by AOT module result extracted by MDRB module

IMAGE PROCESSING METHOD AND RELATED DEVICE

CROSS-REFERENCE TO RELATED APPLICATIONS

This application is a continuation application of International Application No. PCT/KR2022/017785, filed on Nov. 11, 2022, which claims priority to Chinese Patent Application 202111342435.0, filed on Nov. 12, 2021, and Chinese Patent Application 202210821462.4, filed on Jul. 12, 2022, in the China National Intellectual Property Administration, the disclosures of which are incorporated by reference herein in their entireties.

BACKGROUND

1. Field

The present disclosure relates generally to image processing, and more particularly, to a method and an electronic device for performing image processing using artificial intelligence.

2. Description of Related Art

In the art of image processing, after a user edits an image, the editing of the image may cause content to be lost. That is, the editing of the image may generate missing content of the image due to editing. As a result, some blurred, or background cluttered images may be processed. Related image processing operations generally involve image recovering techniques, however, the related image recovering techniques corresponding to image processing may have poor performance.

SUMMARY

Embodiments of the present disclosure provide an image processing method, apparatus, electronic device, computer readable storage medium, and computer program product that may address the technical problem of poor performance of image processing in the related technology.

According to an aspect of the disclosure, an image processing method includes acquiring a target image based on an editing operation on an original image, wherein the target image includes an unknown region formed by the editing operation. In an embodiment, the image processing method includes performing a filling processing operation on the target image to obtain a first filled image including a first target region, wherein the first target region corresponds to the unknown region. In an embodiment, the image processing method includes identifying a target patch based on the first filled image, wherein the target patch corresponds to at least a portion of the first target region. In an embodiment, the image processing method includes calculating a similarity value between the target patch and at least one patch related to the first filled image using a first artificial intelligence (AI) model. In an embodiment, the image processing method includes determining a target residual patch corresponding to the target patch based on the similarity value. In an embodiment, the image processing method includes generating a processing result image based on the target residual patch.

According to an aspect of the disclosure, an electronic device includes a memory storing one or more instructions, and at least one processor communicatively coupled to the memory. In an embodiment, the at least one processor is configured to execute the one or more instructions to acquire a target image based on an editing operation on an original image, wherein the target image includes an unknown region formed by the editing operation. In an embodiment, the at least one processor is configured to execute the one or more instructions to perform a filling processing operation on the target image to obtain a first filled image including a first target region, wherein the first target region corresponds to the unknown region. In an embodiment, the at least one processor is configured to execute the one or more instructions to identify a target patch based on the first filled image, wherein the target patch corresponds to at least a portion of the first target region. In an embodiment, the at least one processor is configured to execute the one or more instructions to calculate a similarity value between the target patch and at least one patch related to the first filled image using a first artificial intelligence (AI) model. In an embodiment, the at least one processor is configured to execute the one or more instructions to determine a target residual patch corresponding to the target patch based on the similarity value. In an embodiment, the at least one processor is configured to execute the one or more instructions to generate a processing result image based on the target residual patch.

According to an aspect of the disclosure, there is provided a non-transitory computer readable storage medium storing a program to be executable by at least one processor to perform an image processing method according to at least one of the above-described embodiments.

BRIEF DESCRIPTION OF DRAWINGS

In order to more clearly illustrate the technical solutions in the embodiments of the present disclosure, the following is a brief description of the accompanying drawings that are necessary to describe the embodiments of the present disclosure.

FIG. 3 is a schematic diagram of second images respectively corresponding to a target region and a third image, according to an embodiment;

DETAILED DESCRIPTION

Figure 1:
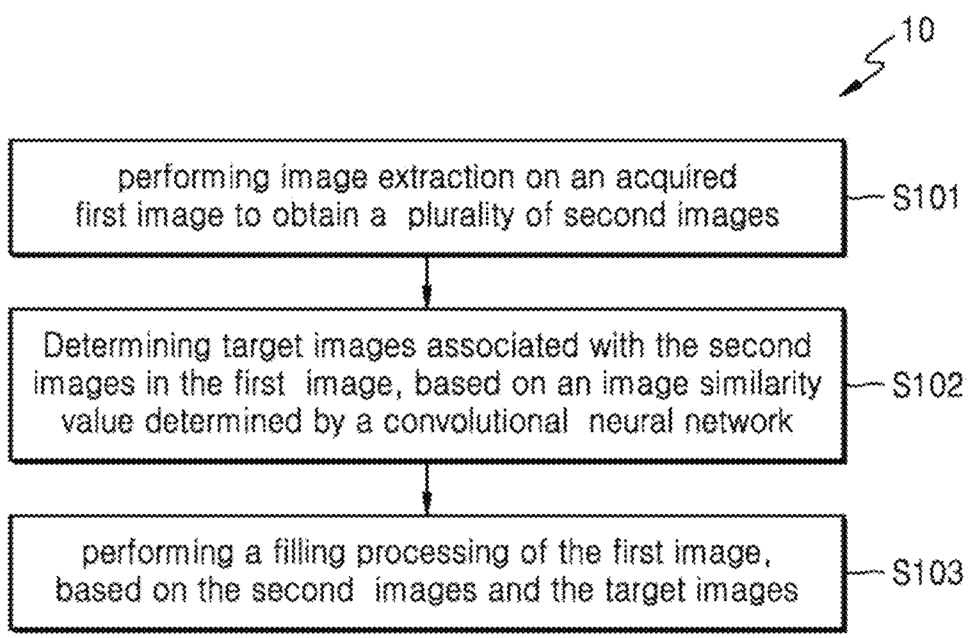
FIG. 1 is a flowchart of an image processing method, according to an embodiment.

Embodiments of the present disclosure are described below in connection with the accompanying drawings in the present disclosure. It should be understood that the embodiments set forth below in conjunction with the accompanying drawings are exemplary descriptions for explaining the technical solutions of the embodiments of the present disclosure and do not constitute a limitation of the technical solutions of the embodiments of the present disclosure.

It will be understood by those skilled in the art that, unless specifically stated, the singular forms "a", "an", "said" and "the" used herein may further comprise plural forms. It should be further understood that the terms "includes" and "comprises" as used in embodiments of the present disclosure mean that the corresponding features may be implemented as the features, information, data, steps, operations, elements, and/or components presented herein, but do not exclude to be implemented as other features, information, data, steps, operations, elements, components and/or a combination thereof supported in the art. It is to be understood that when we refer to an element as being "connected" or "coupled" to the other element, the element may be directly connected or coupled to the other element. Alternatively, it may refer to the element and the other element being connected via an intermediate element. Moreover, the "connected" or "coupled" as used herein may comprise wireless connection or wireless coupling. The term "and/or" as used herein indicates at least one of the items defined by the terms, for example, "A and/or B" indicates an embodiment of "A", or an embodiment of "B", or an embodiment of "A and B".

Throughout the specification, the term "unknown region" may be understood as a region does not comprises image information or data. In some embodiments, the unknown region is a region to be filled by image generation processing or image filling processing.

Throughout the specification, the term "first", "second", "third", . . . may be used to distinguish each element or each configuration in each content item of the specification.

Throughout the specification, the term "patch" may be understood as an image that is at least a part, a portion or a piece of a whole image.

Throughout the specification, the term "residual" may be understood as an element constituting an image content. In some embodiments, the term "residual" may be understood as an element representing high frequency texture of an image.

In order to illustrate the object, technical solutions and advantages of the present disclosure clearer, embodiments of the present disclosure are described in further detail below in conjunction with the accompanying drawings.

The following is a description of the relevant technology involved in the present disclosure.

Artificial Intelligence (AI) is a theory, method, technology, and application system that uses a digital computer or a machine simulation controlled by a digital computer, extends, and expands human intelligence, perceives the environment, acquires knowledge, and uses the knowledge to obtain optimal results. In other words, artificial intelligence is an integrated technology of computer science that attempts to understand the essence of intelligence and to produce a new intelligent machine that may respond in a similar way to human intelligence. Artificial intelligence is also the study of the design principles and implementation methods of various intelligent machines to make the machines capable of perception, reasoning and decision making.

Artificial intelligence technology is a comprehensive discipline that covers a wide range of fields, and has both hardware level technology and software level technology. Basic AI technology generally comprises technologies such as sensors, special AI chips, cloud computing, distributed storage, big data processing technologies, operation/interaction systems, mechatronics. Artificial intelligence software technologies mainly comprise computer vision technology, speech processing technology, natural language processing technology, and machine learning/deep learning and several other major directions. In the present disclosure, computer vision, machine learning/deep learning and other technologies may be involved.

Machine Learning (ML) is a multi-disciplinary interdisciplinary discipline involving probability theory, statistics, approximation theory, convex analysis, algorithmic complexity theory, and many other disciplines. ML specializes in studying how computers may simulate or implement human learning behaviors, so as to acquire new knowledge or skills, and to reorganize existing knowledge structures to continuously improve their performance. Machine learning is a core of artificial intelligence and is the fundamental way to make computers intelligent, and its applications span all areas of artificial intelligence. Machine learning and deep learning usually comprise techniques such as artificial neural networks, confidence networks, reinforcement learning, transfer learning, inductive learning, and style teaching learning.

Computer Vision (CV) is the science of how to make machines "observe". For example, CV refers to machine vision by using cameras and computers instead of human eyes to identify, track, and measure targets and the like. CV further performs graphics processing, so that the image processed by the computer is more suitable for the human eye to observe or to be transmitted to the instrument to detect. As a scientific discipline, computer vision studies related theories and techniques in an attempt to build artificial intelligence systems capable of acquiring information from images or multidimensional data. Computer vision technologies typically comprise technologies such as image processing, image recognition, image semantic understanding, image retrieval, optical character recognition (OCR), video processing, video semantic understanding, video content/behavior recognition, three-dimensional (3D) object reconstruction, 3D technology, virtual reality, augmented reality, simultaneous localization and map construction, autonomous driving, intelligent transportation, and/or other common biometric technologies such as face recognition and fingerprint recognition.

Machine learning/deep learning techniques may be used in the present disclosure to solve the technical problems of high computational complexity and long time consuming in image processing.

The background of the embodiments of the present disclosure may be described below in terms of example scenarios.

Figure 9:
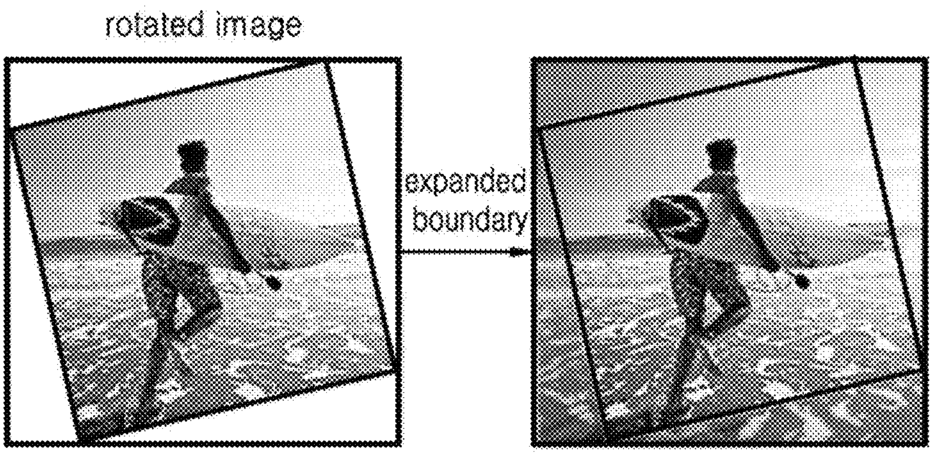
FIG. 9 is a schematic diagram of an image expansion, according to an embodiment.

In one example scenario, after a user edits an image (e.g., rotates the image, changes the angle of the image, zoom in/out the image and perspective transformation of the image, etc.), the image expansion technique may be used to generate the missing content of the image or the content to be expanded of the image due to editing, as described in reference to FIG. 9.

In an alternative or additional example scenario, when a user takes an image with some targets in the background of the image, the user may remove the targets from the background by using image processing functions (e.g., image target removal techniques may be used). For example, if the image taken by the user comprises a plurality of other people (e.g., people in the background) in addition to the user (e.g., in the foreground), the user may select the people in the background to remove them, and then the terminal device may recover the removed area according to the background information to achieve the removal of the targets, and get the result image after removing the specific targets.

In another alternative or additional example scenario, after image processing for a face image comprising a mole, the mole is removed, and the processed face image is obtained.

Image target removal techniques may be principally based on image recovering techniques. By using the region to be removed as the missing region of the image, the missing region is recovered according to the background information by using the image recovering technique. And thus, the target removal of the image is achieved. However, the computational complexity of the image recovering operation in the related technology may be significant, as well as, time-consuming, resulting in a substantial consumption of processing resources (e.g., processor, memory) and a degraded user experience.

Embodiments of the present disclosure provide an image processing method, apparatus, electronic device, computer readable storage medium, and computer program product. Specifically, embodiments of the present disclosure may learn the disciplines for calculating similarity between images during image processing through a network model, so as to perform image processing through a network model, which may reduce the complexity of the calculation, shorten a processing time, reduce memory content occupied by image processing, and improve the user experience.

The technical solution of an embodiment of the present disclosure and the technical effect produced by the technical solution of the present disclosure are described below by describing several exemplary embodiments. It should be noted that the following embodiments may be cross-referenced, borrowed or combined with each other, and the descriptions of the same terms, similar features and similar implementation steps, etc. in different embodiments will not be repeated for the sake of brevity.

An image processing method is provided in embodiments of the present disclosure, as shown in FIG. 1, which illustrates a flowchart of an exemplary process of an image processing method 10 according to embodiments of the present disclosure. The image processing method 10 may be performed by any electronic device, which may be a user terminal or a server. The user terminal may be a smartphone, a tablet, a laptop, a desktop computer, a smart speaker, a smart watch, a car device, and the like. The server may be an independent physical server. The server may further be a server cluster or a distributed system composed of a plurality of physical servers. The server may further be a cloud server that provides cloud services, cloud database, cloud computing, cloud function, cloud storage, network services, cloud communication, middleware services, domain name services, security services, Content Delivery Network (CDN), and big data and artificial intelligence platform, and other basic cloud computing services of the cloud server. The present disclosure is not limited thereto.

As shown in FIG. 1, the image processing method 10 provided may comprise steps S101-S103.

In step S101, the image processing method 10 may include performing image extraction on the acquired first image to obtain a plurality of second images.

Specifically, the first image is an image to be processed. For example, the image after the second filling processing may be an image after the recovering processing or an image after the image expansion process. Alternatively or additionally, when the first image is an image after recovering processing, it may further be an image inputted by the user after shooting. If during the image shooting process the first image is improperly focused for processing, some regions of the image are blurred, and then the image may be inputted into the image processing model provided in the present disclosure, so as to process the image. When the first image is an image which has been image expansion processed, the first image may further be an image edited by the user. If an image content does not comprise any image information, wherein a part of the image content is generated by image expansion after the image is edited, and the image content of this part is blurred, the image may be input into the image processing model provided in the present disclosure to process the image, so as to improve the clarity of the image.

The image extraction on the first image may be achieved by image splitting of the first image, and a plurality of second images resulting from the processing do not interfere with each other. That is, each second image is independent of each other and there is no part of pixel overlap.

Alternatively or additionally, in order to reduce the processing error caused by the image splitting boundaries, which leads to the degradation of the image processing accuracy, the epitaxial length may be configured for the boundaries of the second images. Assuming that a fixed size X×X is configured to split the first image, after the positions of the second images are determined by the fixed size, the fixed size may be extended to obtain the extended size (X+1)×(X+1). A plurality of second images may be extracted from the first image, based on the extended size. There may be an overlap of 1 pixel between the adjacent second images. The above epitaxial length may be configured according to the actual requirements, and the present disclosure is not limited in this regard.

In Step S102, the image processing method 10 may include determining, in the first image, target images associated with the second images, based on the image similarity value determined by the convolutional neural network.

For example, calculating one by one the similarity of the image regions, which have the same size as the second images, in the first image, by the convolutional neural network, based on the size of the second images, and then determining the target images associated with the second images.

In Step S103, the image processing method 10 may include performing a first filling processing of the first image, based on the second images and the target images.

For example, the first filling processing is an operation of pasting a corresponding image for a specific location in the first image. In some embodiments, the first filling processing is, based on the similarity between the second images and the image regions which have the same size as the second images, in the first image. Because an embodiment of the present disclosure uses the image information originally included in the first image to process the first image, the first image is filled based on the extracted second images and the target images (that may have a higher similarity to the second images) associated with the second images, so as to improve the smoothness of the result obtained from processing the first image.

The process of image extraction in some embodiments is described in further detail below.

In an embodiment, in the step S101, performing image extraction on the acquired first image so as to obtain a plurality of second images comprises the following steps A1-A2 (not shown).

In Step A1, the image extraction on the acquired first image may include acquiring a first image processed after a second filling processing. The second filling processing may include determining, in the image to be filled, a target region, in response to an editing operation, and performing a second filling processing on the target region by using image information included in the image to be filled, to obtain the first image.

Figure 4A:
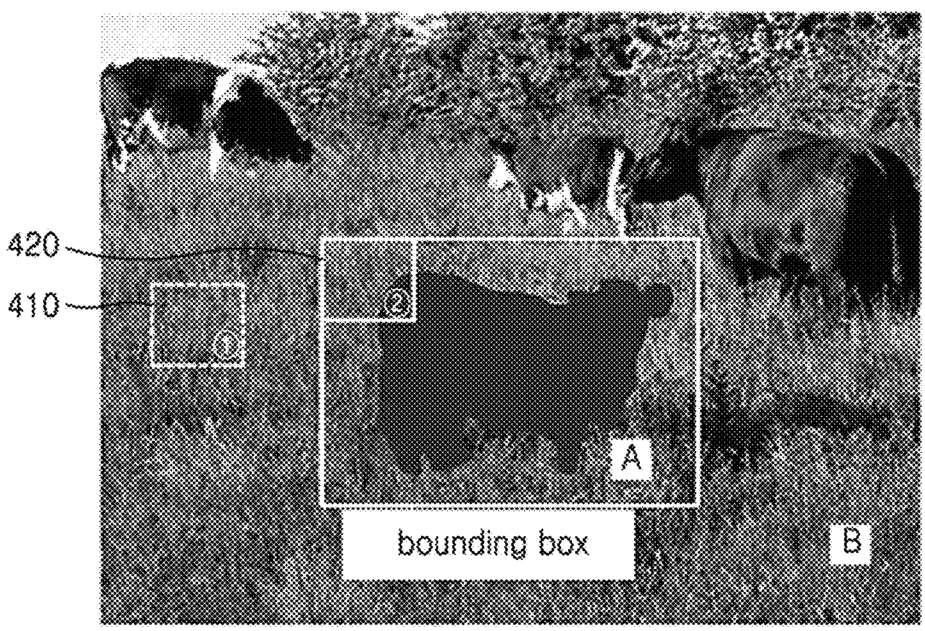
FIG. 4A is a schematic diagram of a processing region in an image processing method, according to an embodiment.
Figure 4B:
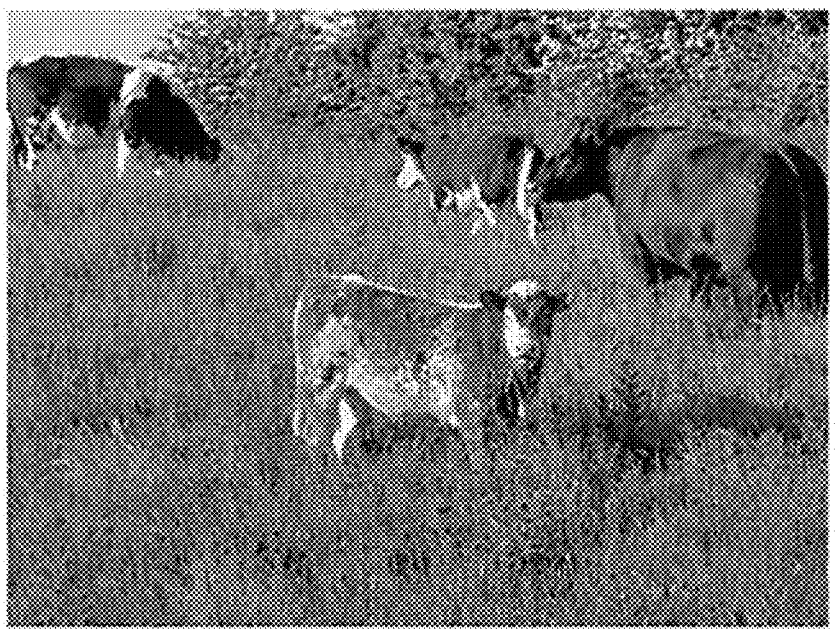
FIG. 4B is a schematic diagram of an image to be processed, according to an embodiment.
Figure 5A:
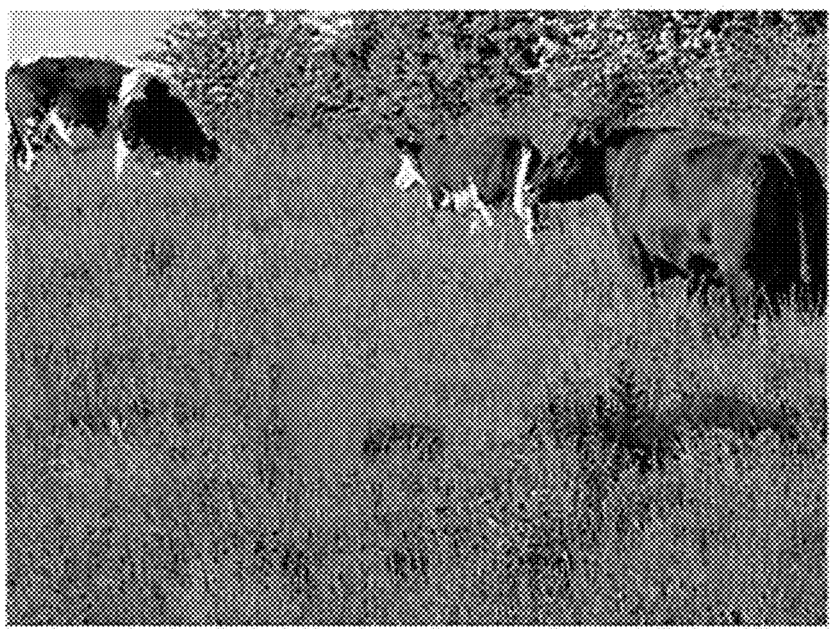
FIG. 5A is a schematic diagram of a result of a processed image, according to an embodiment.

For example, the second filling processing is an image recovering processing (e.g., as shown in FIGS. 4A, 4B and 5A) in which the first image may be an image obtained after processing by an image recovering technique. The recovering processing may be implemented using the PathMatch algorithm. The PathMatch algorithm may refer to an algorithm that may quickly and efficiently find two highly similar regions in two images. That is, given a region in one image, the PathMatch algorithm may find a region in the other image with high similarity to that region in the one image. Based on the PathMatch algorithm, an image region similar to the missing region may be found from the lossless region of the image, and then the founded similar image region may be filled into the missing region, so as to achieve image recovering. A PathMatch process for image recovering is as shown in FIGS. 4A, 4B and 5A. For the image to be recovered (such as the image to be recovered shown in FIG. 4B), the user may select a target region to be removed (the editing operation of the target region, which may be a selection operation) and configure the image value of the region to 0, as shown in the black region in FIG. 4A. According to the external matrix of the target region to be removed, the PathMatch algorithm will select a bounding box larger than the external matrix. The bounding box may cover a part of the additional regions while the bounding box may completely covers the region to be removed. As shown in FIG. 4A, the PathMatch algorithm may regard a region included in the bounding box as an image A, and configure a region outside the bounding box as an image B. The PathMatch algorithm selects a sliding window in a fixed size. The sliding window 420 comprises a part of the image missing region and a part of the image lossless region, as shown in a solid line sliding window in the upper left corner of the image A in FIG. 4A. The sliding window 420 starts sliding at certain intervals in a sequential manner. When the sliding window 420 reaches a certain position, the PathMatch algorithm searches for high similarity regions with the same size in the image non-bounding box (the image B), according to the information of the lossless image contained in the sliding window 420. For example, the dashed region 410 in FIG. 4A is the region with a high similarity relative to the solid sliding window 420 found by the PathMatch algorithm. Then the missing regions in the image are filled with the images of the found high similarity regions. That is, the solid regions 420 are filled with the dashed regions 410. The sliding window 420 is slid again by a step size, to find the high similarity region, and to fill the missing region with the high similarity region, so as to finally realize the image recovering. FIG. 4B and FIG. 5A show a comparison between before image recovering and after image recovering, respectively. The first image in step A1 may refer to the result image obtained after the above image recovering processing as shown in FIG. 5A.

Figure 5B:
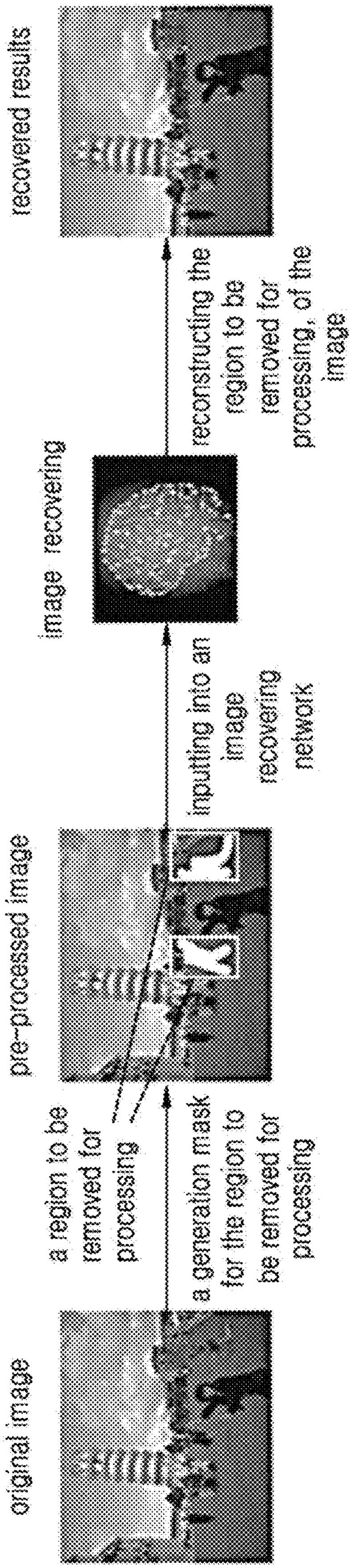
FIG. 5B is a schematic diagram of an image recovering processing flow, according to an embodiment.

Alternatively or additionally, the image recovering performed prior to image processing of the first image, may further be implemented using deep learning-based networks and generative adversarial networks. The learning-based method may use a U-net network (full convolutional network) structure, and may achieve image recovering by using special convolutional operations base on the U-net network, that are specific to image recovering. The learning-based method uses the special convolution operations for image recovering, and requires inputting an image comprising the missing regions and mask images generated from the missing regions. The mask image has only values 0 and 255, which has the same size as the size of pixels of the original image, corresponding to the position of the missing region of the original image. The value of the mask image is 0 and the value of the lossless region is 255. An image recovering flow by using learning-based method may be as shown in FIG. 5B. For example, the user selects the region to be removed for processing (the target region, which may further be referred to as the object region to be removed), from the original image. Based on the user selection, the process configures the pixel value, corresponding to the region to be removed, in the original image as 0 according to the region to be removed for processing selected by the user, and normalizes the pixel values of the preprocessed image from (0, 255) to (−1, 1). The pre-processed image is input to the image recovering network, which uses the trained weight parameters for inference, reconstructs the image region to be removed for processing, outputs the recovered result, and completes the target removal. The first image in step A1 may refer to the recovered processed image received in the image recovering network.

For example, the second filling processing may include the image expansion process, as shown in FIG. 9. The first image may be the image obtained after the image is processed by the image expansion technology. Alternatively or additionally, the algorithm of image recovering may be applied to the image expansion task, and the expansion of the image may further be implemented by using a generative adversarial network, based on a deep learning network. Upon performing the second filling processing based on the artificial intelligence image expansion technique, it may comprise the following operations. Firstly, the pixel size of the expanded image is configured, and the missing region of the original image (the image to be filled) is taken as the region to be expanded (the target region). A mask image in the same size as the expanded image is created, and pixel values of the mask image corresponding to the region of the original image are configured to 1, pixel values of the mask image corresponding to the region of the expanded image are configured to 0. The user-edited original image and the mask image are scaled, and are input to the generative network, and the expanded result map is output after network inference. The generative network may be ahead-of-time (AOT, e.g., a compiler). The network structure may be a U-net structure, a convolution part of the network may be an encoder, a deconvolution part of the network may be a decoder, and the AOT module may be connected between the convolution part and the deconvolution part. Pixels of the input image of the AOT generative network may be 512×512 maximally, and the convolution part may perform down-sampling for the input data twice. That is, the step size of the first convolution is 1, and the step size of the other two convolutions is 2, for example. The extracted feature maps are input to the AOT module, and, after 2 deconvolutions, the data are recovered into images in the same pixel size as the input image. In this stage, the AOT module may consist of a plurality of convolutions, and the input data is divided into two branches, one branch for extracting features and the other branch for an attention mechanism. After one convolution operation, the branch for extracting features is input into different convolutions with different dilation rates; and then the results of these convolutions are input to the next convolution by concatenating them in the channel dimension, and finally the attention mechanism is implemented by doing an element point multiplication operation with the other branch.

In Step A2, the image extraction on the acquired first image may include performing image extraction from the target region of the first image to obtain a plurality of second images.

Figure 2:
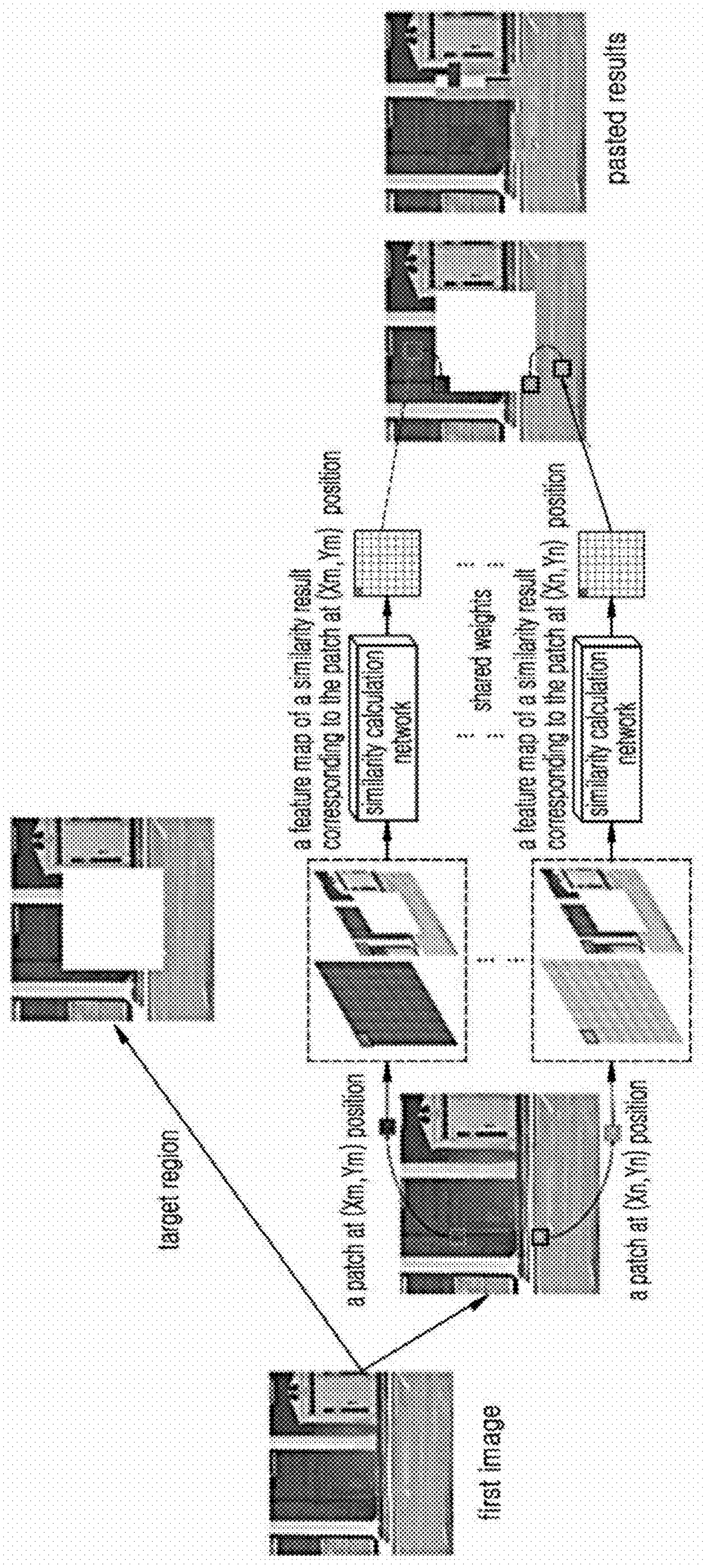
FIG. 2 is a flow schematic diagram of an image processing method, according to an embodiment.

Specifically, as shown in FIG. 2, the target region in the first image is the region determined in step A1 in response to the user's editing operation (e.g., the image region that has been image recovered processed or image expanded processed).

After acquiring the first image, the network may split the first image into an image comprising the target region, and an image corresponding to the target region. Specifically, since an embodiment of the present disclosure performs image processing for the target region in the first image, it is optional to perform image extraction for only the target region in the first image.

Alternatively or additionally, in step A1, determining the target region in the image to be filled, in response to the editing operation, may include determining the image to be filled, based on the image before editing, in response to the editing operation, and determining, in the image to be filled, a region that does not comprise any image information, as the target region.

As shown in FIG. 9, the user can perform a rotate operation to the image. The image before editing is as shown in the region, comprising image information, and located in the left side of FIG. 9. The user's editing operation may rotate the image to a certain angle, and then obtain a square image, as shown in the external box in the left side of FIG. 9. Therefore, the image to be filled can be determined, based on the external box corresponding to the image before editing, and then the region required to be expanded (the region that does not comprise any image information) in the image to be filled, is determined as the target region.

Figure 10:
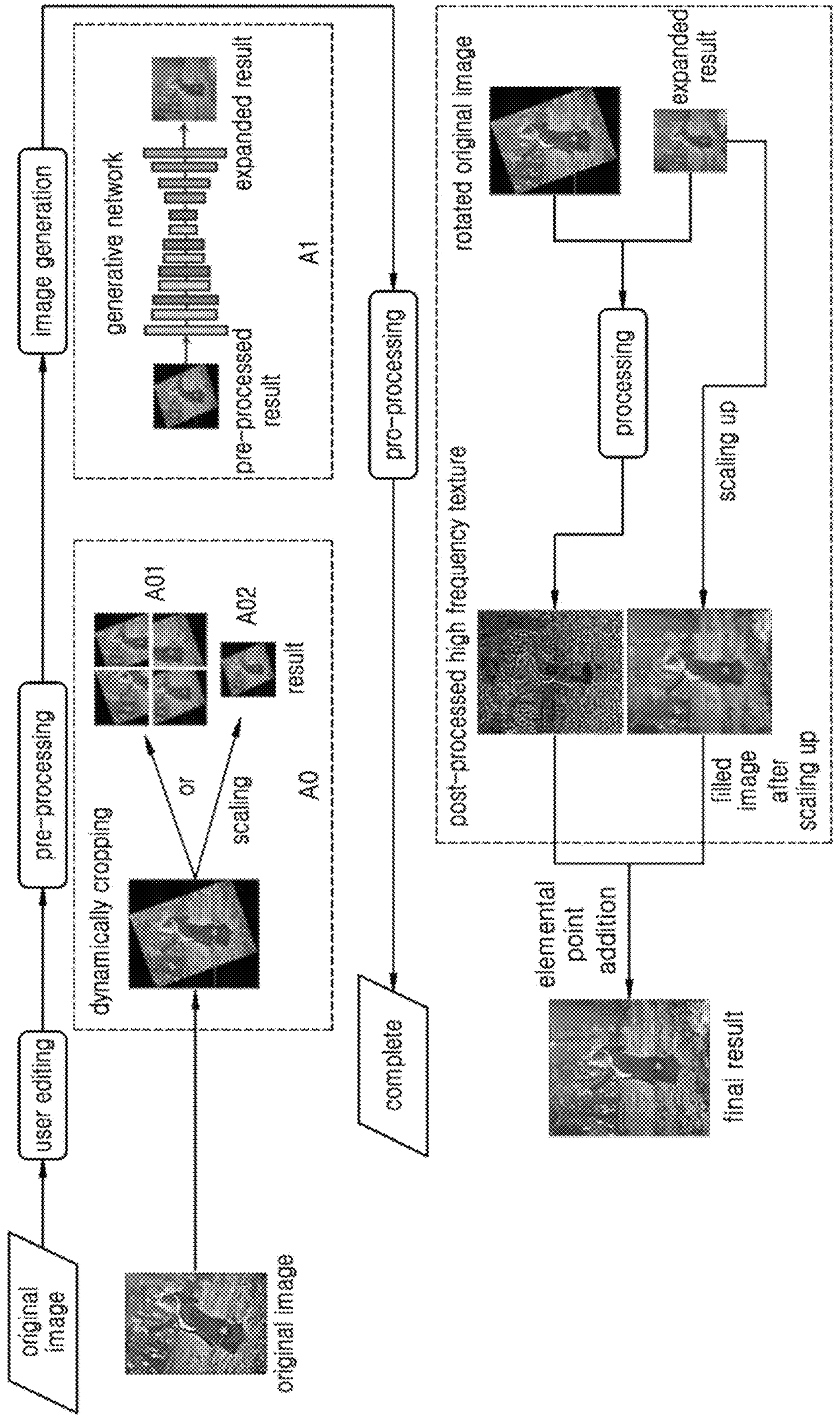
FIG. 10 is a schematic diagram of an overall process of image processing, according to an embodiment.

In some embodiments, as shown in FIG. 10, pre-processing of the image is further provided between user editing and image generation (e.g., the image generation module which processes to obtain the first image). In some embodiments, before performing the second filling processing of the target region by using the image information included in the image to be filled determined in the step A1, step A0 may be further included.

In Step A0, the image processing method 10 may include cropping and/or scaling the image to be filled, based on a predetermined image area.

For example, an embodiment of the present disclosure performs an adaptive image cropping operation in the pre-processing session primarily according to the shape of the target region determined by the user after editing the image.

In some embodiments, in step A0, cropping and/or scaling the image to be filled based on a predetermined image area comprises steps A01 and A02.

In Step A01, if an area of the image to be filled is larger than the predetermined image area, cropping the image to be filled.

For example, determining whether to perform the cropping operation may vary according to the size of the image. If the image is smaller than the determined image area (or size) 512×512 the image is directly input to the subsequent image generative network. Otherwise an adaptive image cropping operation is performed. The image area is only an example, which may be adjusted according to the actual requirements, and the present disclosure is not limited in this regard.

In some embodiments, in step A01, the cropping of the image to be filled comprises steps A011 and A012 (not shown).

Step A011 may include calculating a maximum connected component in a mask image corresponding to the image to be filled.

Step A012 may include cropping the image to be filled, based on minimum bounding squares corresponding to the maximum connected component, to obtain at least one cropped image to be filled.

Figure 11:
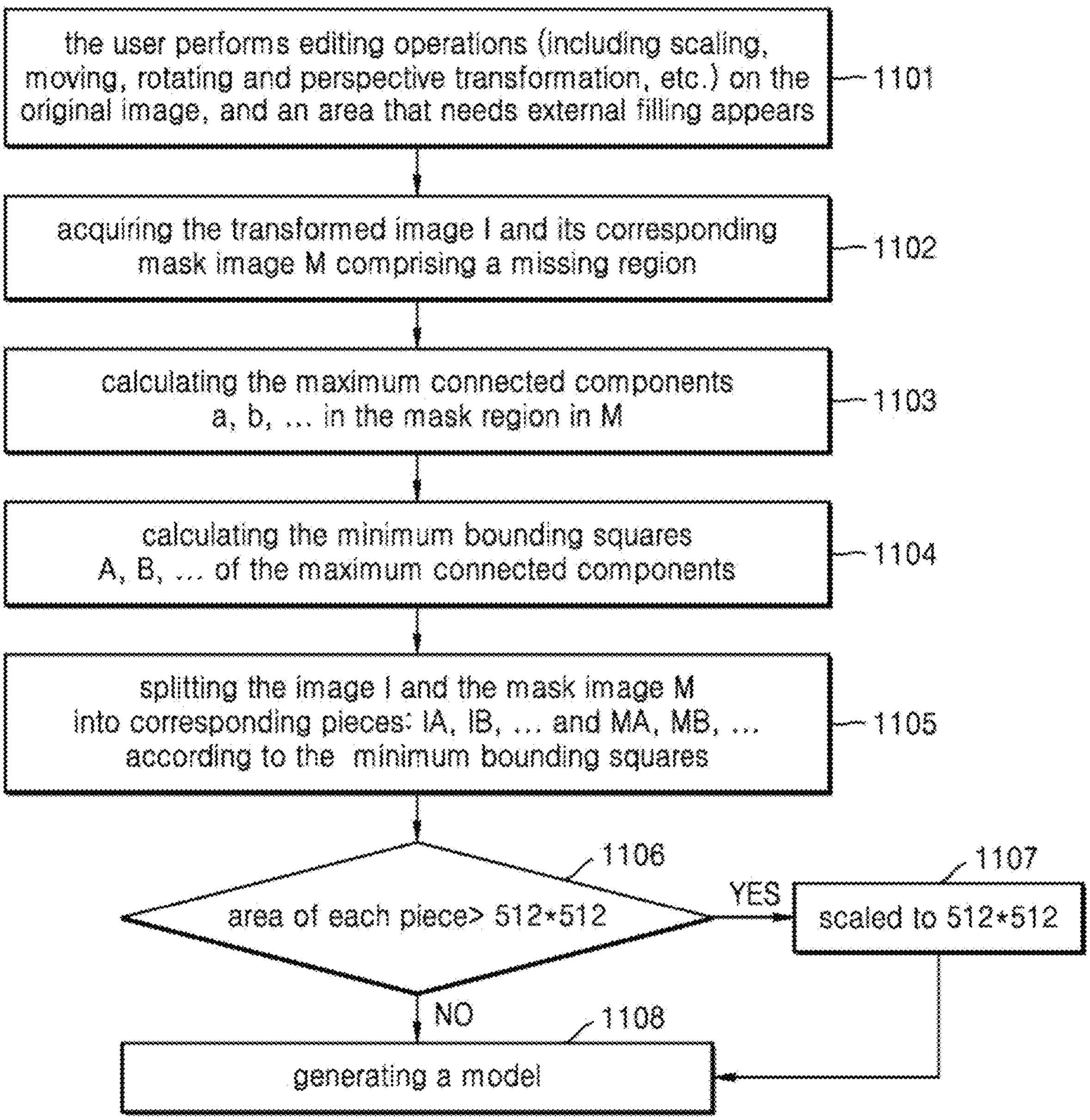
FIG. 11 is a schematic diagram of a process for adaptive image cropping, according to an embodiment.
Figure 12:
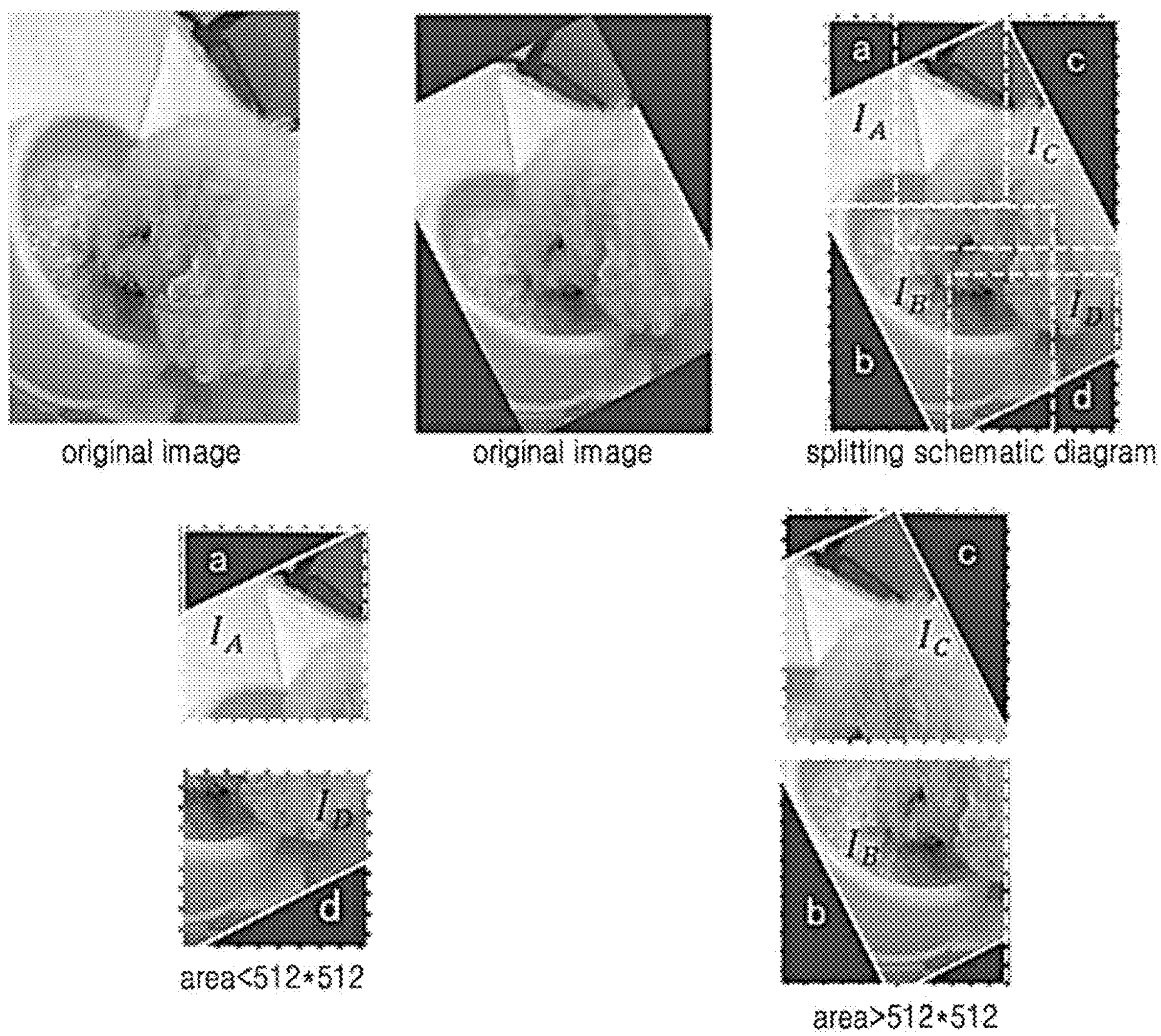
FIG. 12 is a schematic diagram of the image cropped results, according to an embodiment.

As shown in FIG. 11, after the user performs the editing operations (e.g., scaling, rotation, and perspective transformation, etc.) to the original image is performed in step 1101, the edited image I (e.g., the image to be filled) under a new perspective, and its corresponding mask image M comprising a missing region may be obtained based on the edited image, in step 1102. And then, in step 1103, the maximum connected component (such as a, b, c, and d as shown in FIG. 12) are calculated in the image M, and the minimum bounding squares (such as A, B, C and D) respectively corresponding to the maximum connected component are calculated in step 1104. Then, in step 1105, the image I is split into $I_A$, $I_B$, $I_C$, and $I_D$, and the image M is split into $M_A$, $M_B$, $M_C$, and $M_D$, according to these minimum bounding squares.

Returning to FIG. 10, in Step A02, if the area of the cropped image to be filled is larger than the predetermined image area (YES in step 1106 of FIG. 11), scaling down the area of the cropped image to be filled to the predetermined image area (step 1107 of FIG. 11).

For example, the image may be cropped into a plurality of square regions according to the geometry of the target regions. And then the images of these square images that are larger than the predetermined image area of 512×512 are scaled down to 512×512. And if these square images are smaller than (or equal to) 512×512 (NO in step 1106 of FIG. 11), they are directly input to the subsequent image generative network (step 1108 of FIG. 11).

As shown in FIG. 11, in the embodiment of step A02, the area sizes of $I_x$ and $M_x$ (where x is one of A, B, C, and D) are also judged. And if the area of $I_x$ and $M_x$ is larger than the predetermined image area 512×512, the $I_x$ and $M_x$ are scaled down to 512×512, and then they are input to the image generation model for processing. If the area of $I_x$ and $M_x$ is smaller than 512×512, the $I_x$ and $M_x$ are directly input to the image generation model for processing.

In some embodiments, the object of pre-processing is to minimize the ratio of image scaling, and to prevent high frequency texture information from being excessively lost in the image generative network stage.

In some embodiments, as shown in FIG. 10, after being processed in the image generation stage, the image that has been scaled in the pre-processing stage may be input to the post-processing stage for processing. Moreover, the image that has not been scaled has lost less texture information in the image generation stage, and does not need to be input to the post-processing stage for processing, in order to reduce the computational complexity and time consumption.

In some embodiments, it is considered that the AOT module, in the network based on the U-net structure of the AOT module, uses only a limited number of scales of the dilated convolutions, which are performed by the concatenating operation and then are output by the elemental point multiplication operation. However, because some feature points cannot participate in computing when the dilated convolutions extract features, regular texture features cannot be extracted, and then the expanded results cannot recover the semantic textures. A normal convolution calculates all the data in the sliding window sequentially, and the dilated convolution selects some of the data in the sliding window for calculation. For example, the dilated convolution with a dilation rate of 2 only calculates the data of the corresponding positions and not the other positions. Therefore, the spatial structure information of the object in the original image is lost in the high-level semantic feature map, and thus it is difficult to generate regular textures according to the expanded result. To solve this problem, embodiments of the present disclosure propose an improved image complementation network so as to perform second filling processing.

For example, in step A1, performing second filling processing on the target region to obtain a first image by using the image information included in the image to be filled comprises step A11 (not shown).

Step A11 may include sequentially performing at least one down-sampling operation and at least one up-sampling operation, for the image to be filled, to obtain the first image.

In some embodiments, whenever performing a down-sampling operation may further include performing a dilated convolution operation, for the feature map obtained from the down-sampling operation, based on a different dilation rate.

Figure 13:
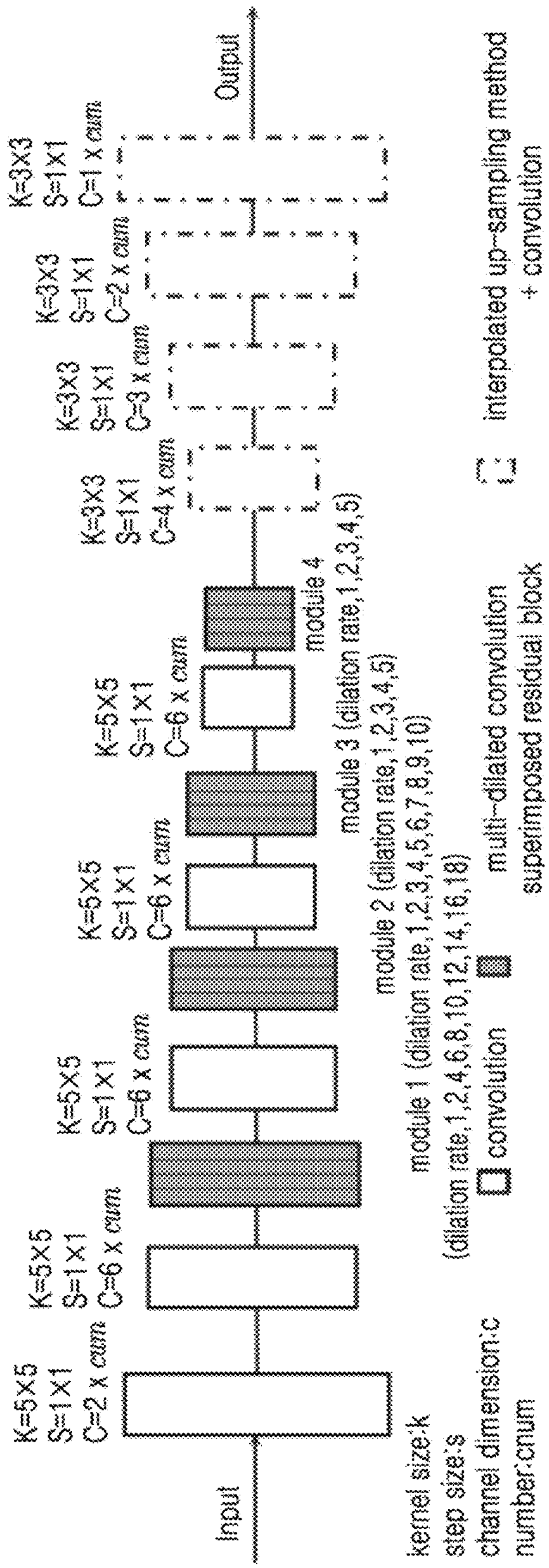
FIG. 13 is a schematic diagram of a structure of an image complementation network, according to an embodiment.

For example, some embodiments may use a Multi-Dilated Residual Block (MDRB) instead of the AOT module, and a network structure of an image complementation network as shown in FIG. 13. The inputs are the original image (e.g., the image to be filled) and its corresponding mask image; and the original image is an RGB three-channel image with values normalized from 0 to 255 to between −1 and 1. As shown in FIG. 13, the generative network comprises at least one convolution module, at least one multi-dilated convolution superimposed residual block and at least one interpolated up-sampling module. After inputting the data, the image is subjected to feature extraction with a convolution operation, as well as to a down-sampling operation with a convolution of step size value 2 (as an example only, other step sizes may be used). Whenever performing a down-sampling operation, they are input to the multiscale dilated convolution superimposed module; and after a plurality of down-samplings, the feature maps obtained from the processing are input to the interpolated up-sampling for operating; and finally the first image after expanding (for the second filling processing) is output. As shown in FIG. 13, the dilation rates of the modules in the MDRB are different. However, in some embodiments, the dilation rates of the modules may be the same. The present disclosure is not limited in this regard.

Alternatively or additionally, the dilated convolution operation is performed for the feature map obtained from down-sampling, based on different null rates, comprising steps A111-A113 (not shown).

Step A111 may include splitting the down-sampled feature map into at least one sub-feature map, based on a predetermined number of dilated convolutions.

Figure 14:
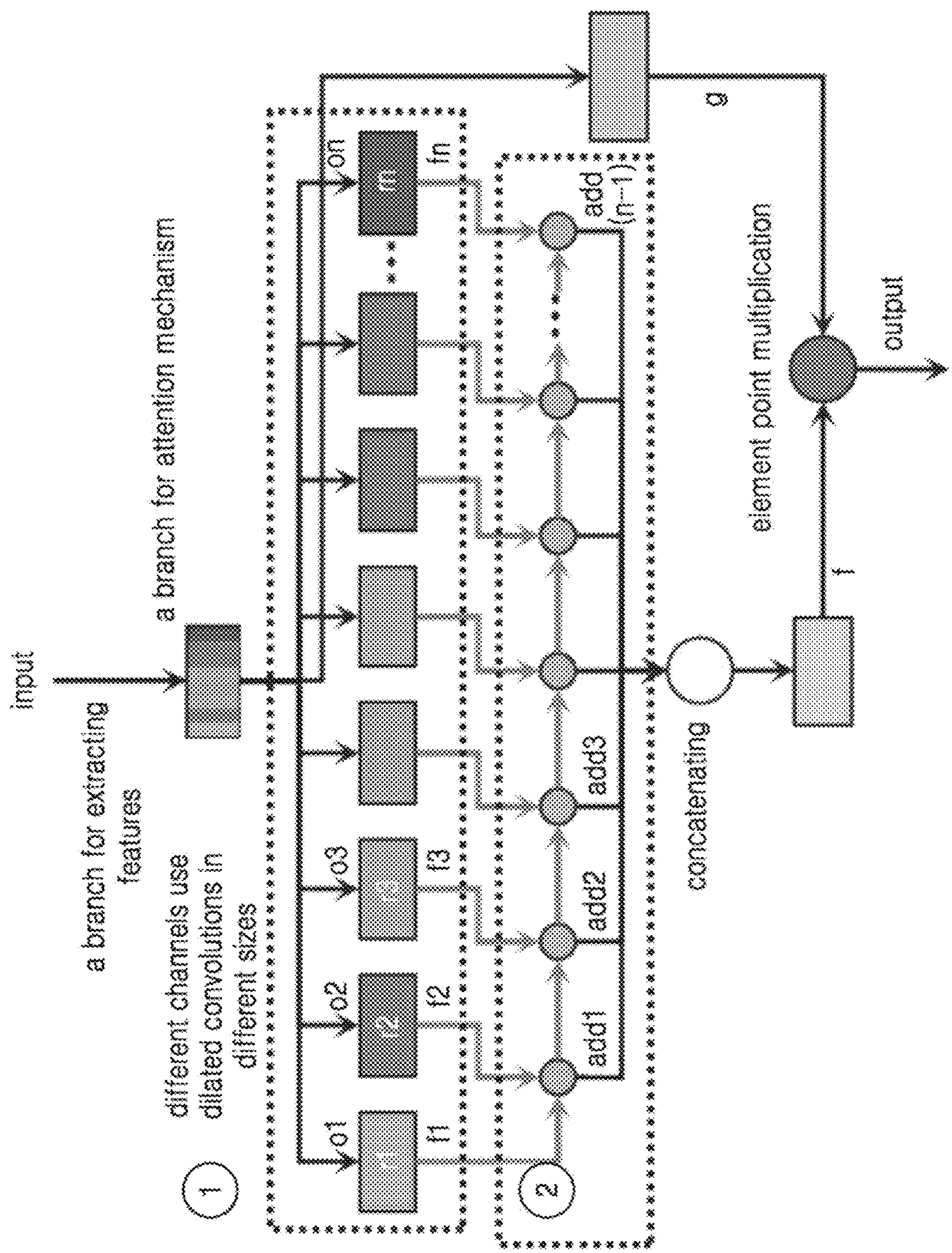
FIG. 14 is a schematic diagram of the network structure of the multi-dilated convolution superimposed residual block, according to an embodiment.

For example, as shown in FIG. 14, the data input to the MDRB module may be divided into 2 branches, one branch for extracting feature maps and one branch for operating an attention mechanism. In some embodiments, the data in both branches and the input data may be the same.

In the branch for extracting features, the data are convolved, and then the new feature maps are extracted, and then the new extracted feature maps are output. These feature maps are divided into n groups according to channel dimensions, which may be configured as o1, o2, o3, . . . , on. The input feature maps would be divided into a plurality of groups according to channel dimensions. If the input data dimensions are (e.g., 1, 128, 128, 64), the feature maps would be split according to the predetermined number of dilated convolutions. If 8 dilated convolutions are predetermined, the feature maps may be divided into 8 sub-feature maps (e.g., 1, 128, 128, 8). If 16 dilated convolutions are predetermined, the feature maps may be divided into 16 sub-feature maps (e.g., 1, 128, 128, 4). It may be understood that the larger the predetermined number of dilated convolutions, the larger the texture information that may be compensated by the operation of the multi-dilated convolution superimposed residual block. However, when configuring the number of dilated convolutions, the present disclosure further takes into account the receptive field, and thus, the number of dilated convolutions may be configured according to the actual requirements, by making a trade-off between the texture information that may be compensated and the receptive field.

Step A112 may include performing feature extraction for different sub-feature maps by using different dilation rates.

For example, each sub-feature map is input to the dilated convolution with a different dilation rate for feature extraction. As shown in FIG. 14, the sub-feature maps o1, o2, o3, . . . , on are input to the convolutions with dilation rates of r1, r2, r3, . . . , rn, respectively, to obtain new feature maps f1, f2, f3, . . . , fn generated by the dilated convolution, respectively.

Step A113 may include determining the outputs of the dilated convolutions, based on the feature extraction result of the sub-feature maps.

Figure 15A:
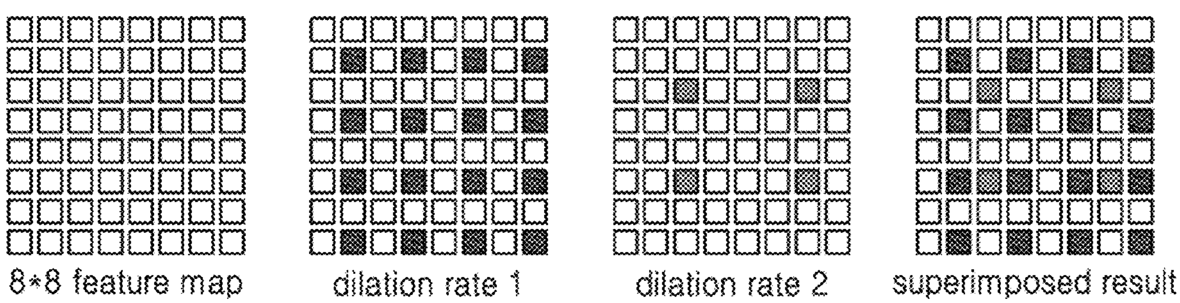
FIG. 15A is a schematic diagram of superimposing different dilated convolution results, according to an embodiment.
Figure 15B:
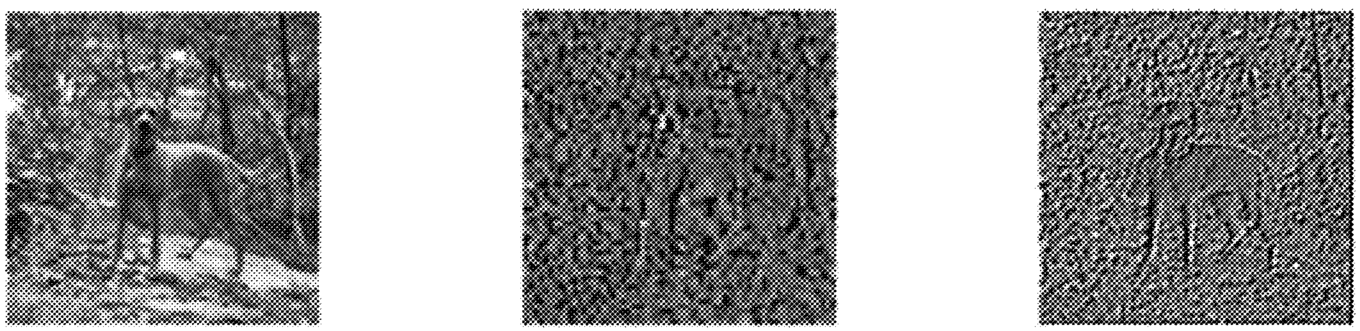
FIG. 15B is a comparison diagram of the results of feature extraction, based on different networks, according to an embodiment.
Figure 15C:
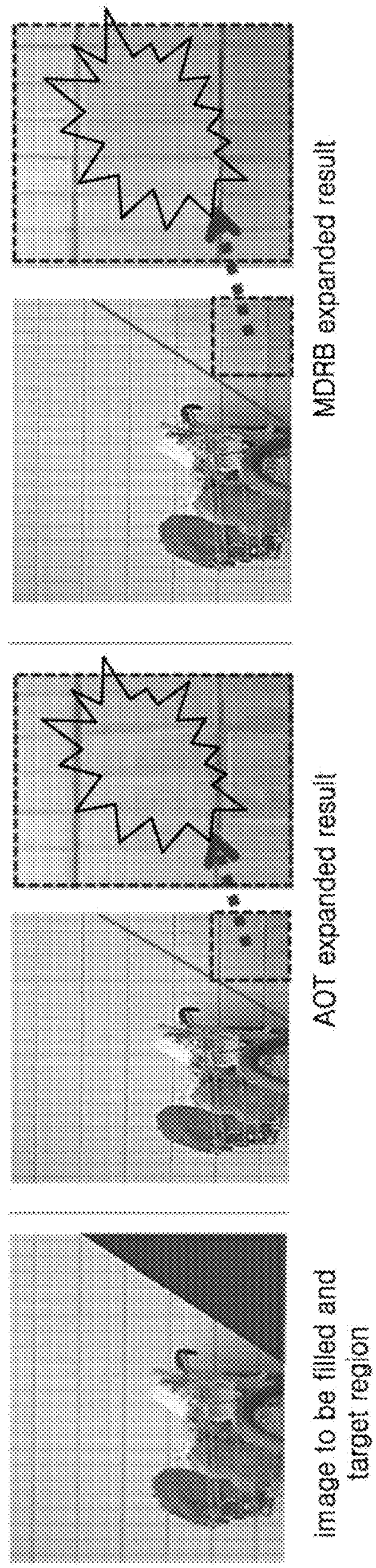
FIG. 15C is a comparison of the results of an ahead-of-time (AOT)-based and a Multi-Dilated Residual Block (MDRB)-based image expansion, respectively, according to an embodiment.

For example, more structural texture information lost by the dilated convolution may be obtained by collecting the feature extraction result of the sub-feature maps. The principle of the superimposed residual operation is that there are differences in the positions of features extracted by different dilation rate convolutions and differences in the positions of features not extracted, and by using more types of dilation rate convolutions and collecting the information of these differences, the lost structural texture information of the dilated convolution may be obtained to the maximum extent, as shown in FIG. 15A. For example, given that the 8×8 feature map is the original feature map, a schematic diagram of one dilated convolution with a dilation rate of 1 is a gray region in the second figure of FIG. 15A, and positions of features extracted with a dilation rate of 2 is a gray region in the third figure of FIG. 15A. Both different dilated convolutions have the same problem that some position information cannot be extracted when extracting features, and that there are differences in the missing position information. After using the superimposed operation, the respective missing information may be collected to a maximum extent, so that more complete structural texture information may be extracted, and the experimental results are shown in FIG. 15B. The final expansion results by using AOT and MDRB are shown in FIG. 15C. The AOT cannot recover the structural information of the tile regularity. However, the processing of MDRB may expand the tile region by collecting the superimposed information between different dilated convolutions, and moreover, the generated contents comply with the realistic reality more.

Alternatively or additionally, determining the output of the dilated convolution based on a feature extraction result of the sub-feature maps, comprises performing a summing operation for a feature extraction result of the sub-feature maps so as to obtain a plurality of pieces of superimposed information, concatenating the pieces of superimposed information, and determining the output of the dilated convolution, based on the concatenated superimposed information. The summing operation comprises summing a feature extraction result of a current sub-feature map with a result obtained from a previous summing operation, so as to obtain the superimposed information associated with the current sub-feature map.

For example, as shown in FIG. 14, f1 and f2 may be added so as to obtain add1 (superimposed information). And then f3 and add1 may be added so as to obtain add2. And similarly, f4 and add2 may be added so as to obtain add3. The operations are repeated until fn and add(n−2) are added so as to obtain add(n−1). And then concatenate f1, add1, add2, . . . , add(n−1) in the channel dimension to obtain the new feature map (an output of the dilated convolution). The channel dimension of the feature map f after concatenating in the channel dimension is the same as the dimension of the feature map of the input data, because the number of channels of these feature maps concatenated are all 1/n times of the original input data.

Alternatively or additionally, in order to more quickly achieve collecting the feature extraction result of the sub-feature maps, the above residual superimposed operations may be completed one by one, based on the order in which the sub-feature maps are obtained by splitting in step A111 (not shown).

Therefore, the feature maps generated by these dilated convolutions are concatenated in the channel dimension, and then are input to the subsequent convolutions, while combining another branch convolution to complete the attention mechanism operation.

In the branch used for the attention mechanism, the input feature map is input to the convolution, when the feature map g output from this convolution is kept in the same dimension as the input data, and it is necessary for this branch to output by using the activation function (sigmoid) so as to ensure that the value of the feature map of the branch used for the attention mechanism ranges from 0 to 1. Alternatively or additionally, the element point multiplication operation may be used for the feature map f and the feature map g so as to implement the attention mechanism. The meanings of the values 0 to 1 in the feature map g are values of features in the feature map f at the corresponding positions, which are involved in the weights of the image expansion. That is, for the final image expansion problem, the feature map g indicates which features in the feature map f are used and what weights are used.

In an embodiment, in step A2, performing image extraction from the target region of the first image to obtain a plurality of second images comprises the following step A31 (not shown).

Step A31 may include performing image extraction from the target region of the first image to obtain a plurality of second images, based on a predetermined first image size and a predetermined image extraction order.

The image extraction order comprises at least one of from top to bottom, and from left to right.

For example, the first image size affects the fine granularity of image information splitting of the target region, which may be adjusted according to the actual requirements in some embodiments and is not limited herein. The larger the first image size, the greater the fine granularity and the relatively longer the computation time. Alternatively or additionally, the smaller the first image size, the smaller the fine granularity and the relatively shorter the computation time.

Alternatively or additionally, the first image size is related to the target region, and in order to make the image processing network provided by the present disclosure have better processing performance, the image size of the region to be processed may be predetermined. If the size of the currently determined target region is different from the size of the predetermined region, the image of the currently determined target region to be processed may be transformed in size.

In some embodiments, the image extraction order may further be adjusted, based on the first image size and the size of the target region. If it could be determined the plurality of the split second images larger than 3, according to the target region and the first image size, the image extraction operation may be performed from top to bottom and from left to right, based on the predetermined image extraction order.

Alternatively or additionally, the second images extracted based on the predetermined image extraction order, have a characteristic of sequential order and no overlap.

Figure 6A:
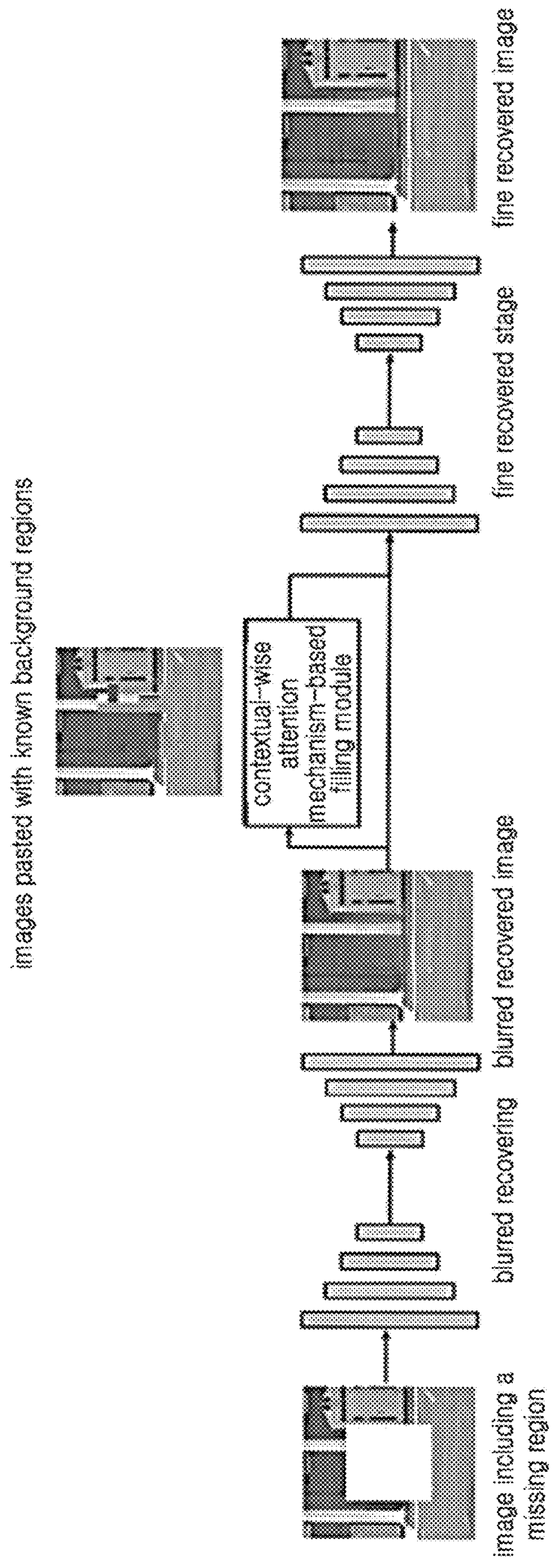
FIG. 6A is a schematic diagram of an architecture of a network, according to an embodiment.

Adapted to the image processing method of the above embodiment, in some embodiments, a contextual-wise Attention Module (C-wAM) is provided, as shown in FIG. 6A. The network module facilitates extending the receptive field of the current recovering network to better process ultra-high resolution images. CNN (Convolutional Neural Networks) may be used in C-wAM to compare the similarity degree (or matching degree) between images. And its input comprises two images, such as the image corresponding to the target region shown in FIG. 3 and the third image. And the output comprises a similarity value between the second image currently processed, and the other second images (which may be expressed in a form of a similarity feature map).

The specific process of performing the first filling processing for the second images in some embodiments is described below.

In an embodiment, in the step S102, performing the first filling processing for at least one second image comprises the following step B1 (not shown).

Step B1 may include performing the first filling process for the second images sequentially, based on the image extraction order.

For example, in order to potentially reduce the time consumed for performing the first filling processing operation of the first image, such as the complexity of calculating the filling position, and in order to shorten the corresponding time consumed, the first filling processing may be performed to the second images corresponding to the predetermined image extraction order. Assuming that 4 second images are extracted for the target regions, the order of the second images may be as follows: second image A, second image B, second image C, and second image D; and the positions of the second images A, B, C, and D are upper left, upper right, lower left, and lower right. At this time, when the first filling processing is performed, the second images at the corresponding positions are obtained, according to this image order, in order to perform the first filling processing.

In some embodiment, because the second images are extracted based on the image extraction order, the order in which the similarity information is output is consistent with the extraction order of the second images. And this processing facilitates quickly understanding of the filling positions corresponding to the second images in the first image.

In an embodiment, in the step S102, determining, the target images associated with the second images in the first image, based on the image similarity value determined by the convolutional neural network, comprises: for each second image, performing the following operations of steps C1-C3 (not shown).

Step C1 may include tiling the second images to obtain a third image with an image size corresponding to the target region.

For example, the order of tiling the images may be the same as the order of image extraction, such as when 9 second images are extracted for the target region, and when tiling a second image in an image position on the upper left in the first order, a third image of 3×3 may be obtained by tiling. That is, the third image comprises 9 images in the first order. Accordingly, at this time, the target region corresponds to 9 different second images, and the third image comprises 9 identical second images. If the first filling processing is an operation performed for all the second images, then, when the target region is extracted to obtain 9 second images, 9 third images are obtained accordingly.

The size of the target region may the same as the image size of the third image.

Step C2 may include the similarity values of the second image relative to the other second images are calculated by the convolutional neural network, based on the third image, to obtain a similarity feature map.

Specifically, as shown in FIG. 3, assuming that 9 second images (sorted as 91, 92, 93, 94, 95, 96, 97, 98, 99, respectively) are extracted for the target region, when the first filling processing is currently performed for the second image 92 located in the left center and in the second order, a third image comprising 9 identical second images 92 is obtained for the second image. At this time, the similarity values between the second images 92 at different positions in the third image and the second images at different positions in the target region may be calculated based on the third image. And then a similarity feature map (also called an attention score map when applying the C-wAM network) comprising the corresponding similarity values at different positions may be output. The similarity feature map may further be a similarity matrix denoting the similarity values between the second images at different positions. That is, the similarity values between the second image 92 and the second images 91, 92, 93, 94, 95, 96, 97, 98, 99, respectively, may be obtained.

As shown in FIG. 2, the similarity calculation is performed by the similarity calculation network for a second image (patch) at the (Xm, Ym) position. And the similarity values of the second image at the (Xm, Ym) position to the second images at different positions in the target region may be output. If the similarity calculation network performs step C2 for the second images when performing the similarity calculation, the weight coefficients used at different positions remain the same.

Step C3 may include determining a target position in the target region for the target image, with the highest similarity to that second image, based on the similarity feature map.

As shown in FIG. 3, if step C3 is performed for the second image 92, when it is determined that the current second image 92 has the highest similarity to the second image 99 in the target region, the position of the second image 99 (e.g., the target image) in the target region will be determined as the target position.

In step S103, performing a first filling processing of the first image, based on the second images and the target images, comprises a step C4 (not shown).

Step C4 may include filling the second images to the target position.

For example, when the first filling processing is performed, the target region may be a blank region (e.g., not comprise any image information), as shown in FIG. 3. At this time, if it is determined that the most similar is the second image 99 when step C3 is performed for the second image 99, the second image 92 may be filled to the position in the target region where the original second image 99 was located.

In some embodiments, considering that steps C3 and C4 are performed based on the target image that is most similar to the second images, it may occur that some second images in the target region are located at positions that are not filled by the second images in the third image. At this time, the second image corresponding to that position in the target region may be filled, that is, the second image at that position is not replaced.

For example, as shown in FIG. 3, assuming that the second images cannot correspond to the second image 93 in the target region as the most similar image (e.g., the target image cannot be determined), at this time, there will be no second image to fill the image position at which the second image 93 in the target region is located. Therefore, after the first filling processing is performed, the image position that is not filled will be filled by obtaining the second image in the target region, that is, the second image 93 in the target region is used as its own filling image.

Alternatively or additionally, the target region may further comprise corresponding image information when the first filling processing is performed. Therefore, only the image information at the image position that is necessary to be filled is changed.

In an embodiment, steps C01-C02 (not shown) are further included before performing the step C2.

Step C01 may include transforming the third image based on the predetermined second image size, to obtain the transformed third image.

Step C02 may include down-sampling the transformed third image based on the predetermined first image size and the predetermined second image size, to obtain the down-sampled third image.

The first image size may be a size for extracting the second images from the target region of the first image.

As shown in FIG. 2, upon performing the image processing method step, the image recovering network provided in some embodiments comprises a similarity calculation network module, the input of which is the third image obtained by tiling the second images. In some embodiments, the size of the input image may be configured with the image size of the corresponding second image in order to better balance the fine granularity of the image processing and the computational time.

Alternatively or additionally, the image size of the input similarity calculation network may be configured to 256×256 (e.g., the predetermined second image size), and if the image size of the input network does not match the configured size, step C01 may be performed to transform the image and obtain the transformed third image, and then perform similarity calculation, based on the transformed third image.

That is, the number of down-samplings of the similarity calculation network depends on the first image size. Assuming that the input image size of the image recovering network is 512×512 and the first image size is 32×32, the height and width of the feature map for the second images output by the similarity calculation network is (512/32)×(512/32)=16×16. That is, it is necessary for the similarity calculation network to down-sample an input in an image size of 256×256 into a 16×16 feature map. That is, 4 down-sampling processes are performed.

Figure 6B:
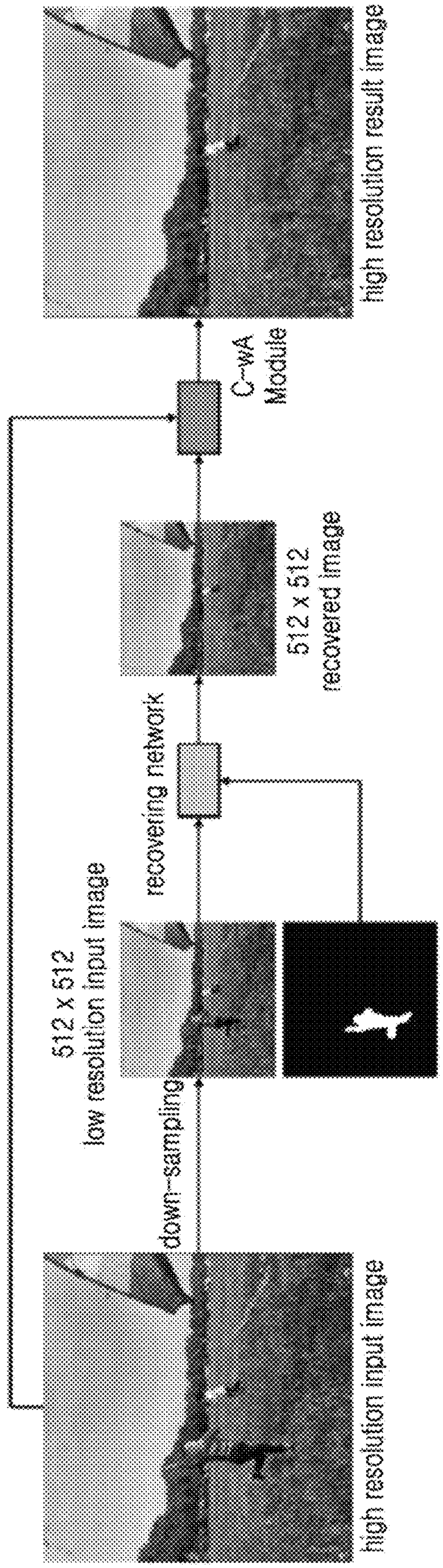
FIG. 6B is a schematic diagram of an architecture of an ultra-high resolution recovering network, according to an embodiment.
Figure 6C:
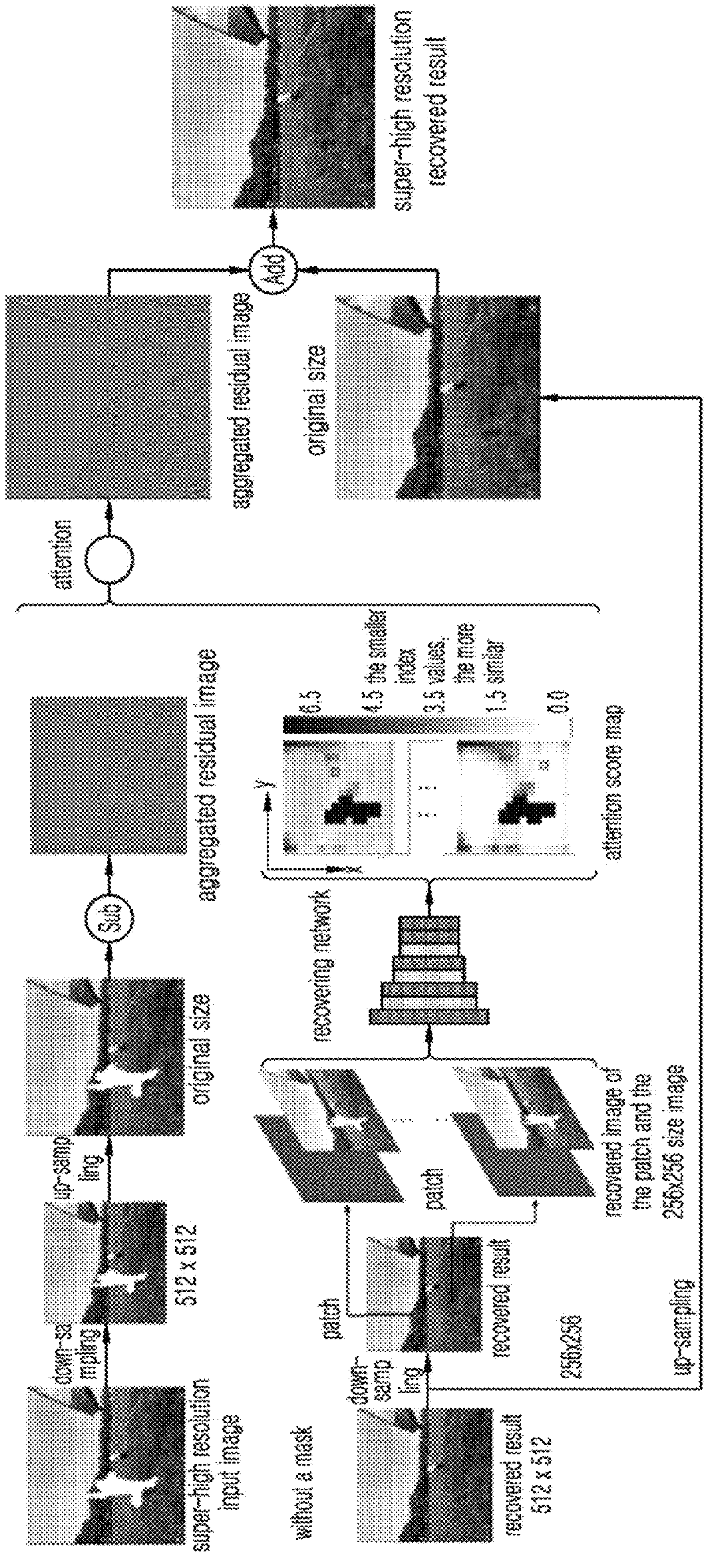
FIG. 6C is a schematic diagram of an architecture of an ultra-high resolution recovering network, according to an embodiment.

In some embodiments, adapting the above C-wAM network module, an ultra-high resolution recovering network is further provided, as shown in FIGS. 6A, 6B, and 6C. Specifically, in the C-wAM network module, the coarse recovered result of 512×512 (e.g., an recovered image recovered by the previously recovering network) may be down-sampled to a 256×256 image (e.g., the first image), and then each patch image may be tiled into a size of 256×256. And then they and the image (256×256) of the target region are input to the Patch Network (constructed by the convolutional neural network). By a matching operation, an attention score map may be obtained. And the smaller the index value, the more similar the positions of the patches are (depending on a configuration of a loss function. Alternatively, the larger the index value, the more similar the positions of the patches are). The minimum position (x, y) directly may correspond to the best suitable residual image patch region, therefore, at the Attend attention stage, the C-wAM may fill the missing regions quickly with the patch of known residual image. Finally, the original size of the coarse recovered result and the aggregated residual image may be combined, so as to output the final recovered result (ultra-high resolution recovered result image).

In some embodiments, the image processing method further comprises step S103 of outputting the target image obtained after the image processing, to a refine recovering module of the image processing network.

The image processing network (C-wAM) provided in some embodiments may further be fused into any image recovering network as a separate module, or as a post-processing operation of any image recovering network, so as to improve the fine granularity and the clarity of the image processed by the recovering network.

Alternatively or additionally, as shown in FIG. 6A, the image processing network provided by an embodiment of the present disclosure may be fused in a filling module based on the contextual-wise attention mechanism as shown in FIG. 6A. In the processing flow, the blurred recovered image may be directly input to a pasting module based on the contextual-wise attention mechanism for processing. And then the pasted result (the processed result obtained by performing steps S101-S102 above) and the blurred recovered image may be input together to the fine recovering stage, so as to output the final recovered image.

Figure 7:
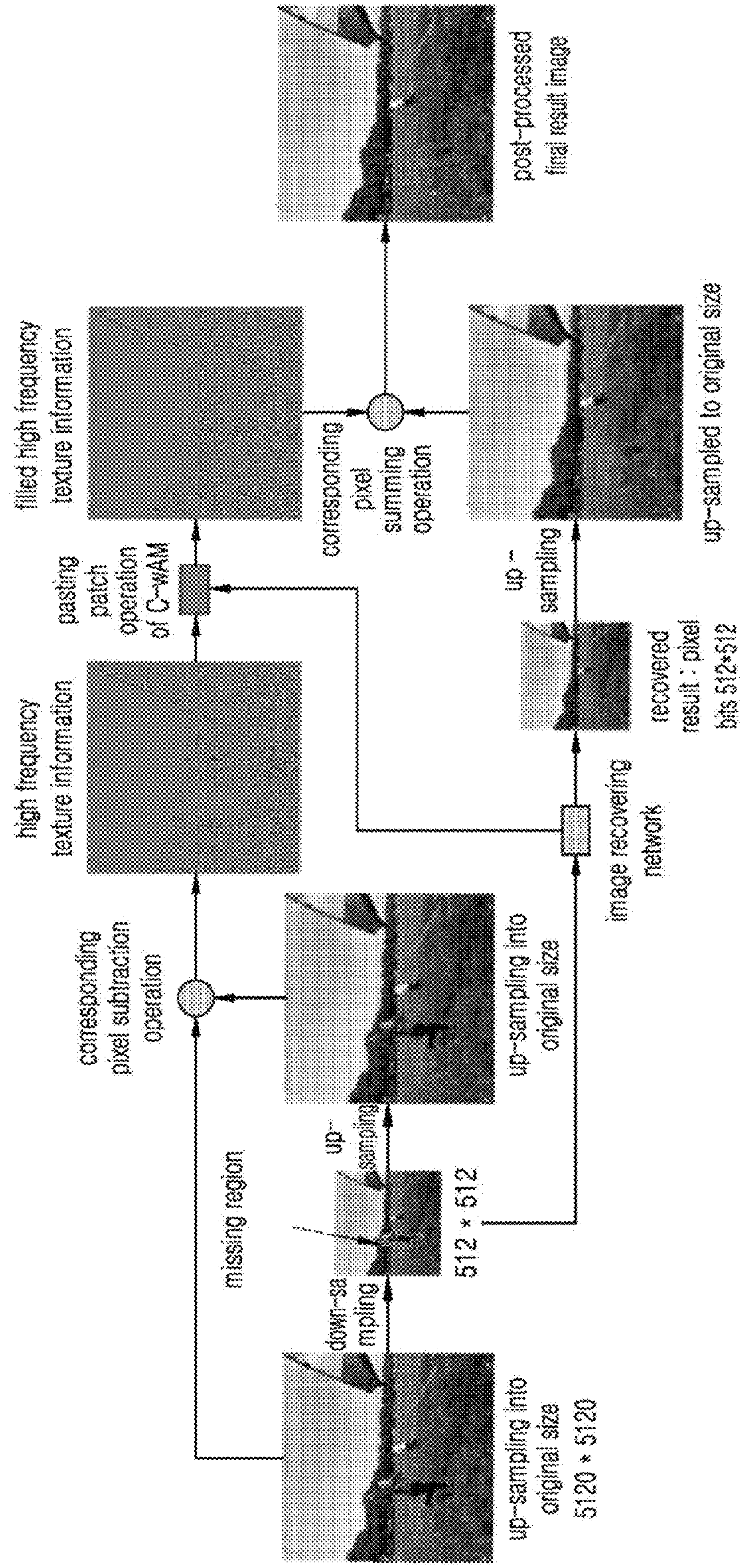
FIG. 7 is a schematic diagram of another network architecture, according to an embodiment.

Alternatively or additionally, as shown in FIG. 7, the image processing network provided in some embodiments may be fused in the pasting patch operation module based on contextual attention mechanism as shown in FIG. 7. And the processed result and the result image obtained from up-sampling are processed together, so as to finally obtain the final result map of post-processing.

The following description is provided for a processing flow and a training process of the C-wAM network provided by the embodiments of the present disclosure.

The C-wAM network provided in some embodiments (e.g., as shown in FIG. 6C) uses Convolutional Neural Network (CNN) to determine the matching degree between images. Accordingly, an attention loss function is proposed, so as to resolve the problems caused by the characteristics of CNN during the training process.

Figure 6D:
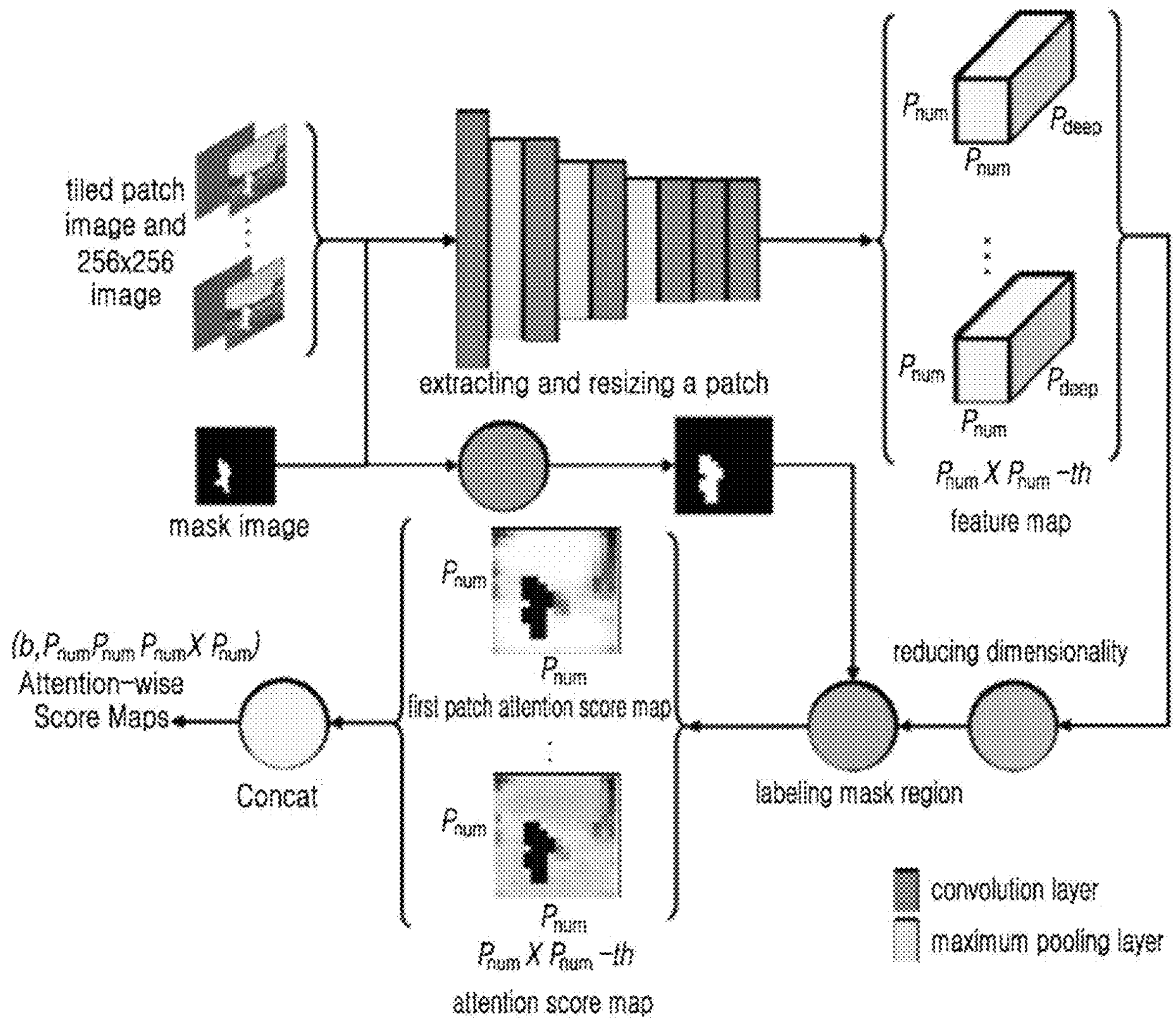
FIG. 6D is a schematic diagram of a processing flow of a recovering network, according to an embodiment.

As shown in FIG. 6C, the recovered result of 512×512 is first resized to 256×256. And then the 256×256 image is split into ($P_{num}$×$P_{num}$) patches, where $P_{num}$ denotes the number of patch images (e.g., the second images) per column or row. Moreover, each patch is separately tiled into a size of 256×256, so as to obtain $P_{num}$×$P_{num}$ tiled images in a size of 256×256. Next, in order to obtain the desired A-wSM (Attention-wise Score Maps), the third image obtained by tiling inputs into the Patch Network containing a maximum pooling layer and a convolutional layer. The Patch Network provided in some embodiments is similar to an image classification network, but the output of the Patch Network is configured to represent the similarity between one second image and the other second images, as shown in FIG. 6D. An objective of the Patch Network is to ensure that the output of the last convolutional layer is a feature map in a shape of ($P_{num}$×$P_{num}$, $P_{num}$, $P_{num}$, $P_{deep}$). $P_{deep}$ is a customized hyper-parameter that corresponds to the accuracy of A-wSM, in which the higher the $P_{deep}$ value, the higher the accuracy of A-wSM. In the stage of extracting the feature map, the first layer may use a convolutional layer with a 5×5 kernel size, a 1×1 step size and 16 output channels. Furthermore, except for the last layer, other convolutional layers with 3×3 kernel size, 1×1 step size and 32, 64 and 64 channels may be used, respectively. Each maximum pooling layer has a step size of 2×2. However, all the convolutional layers may use the ReLU activation function.

By patching the network, all tiled patch images comprising known images will be transformed into $P_{num}$×$P_{num}$ feature maps $M_1$ in a shape of (1, $P_{num}$, $P_{num}$, $P_{deep}$). $P_{deep}$ is the depth of the configured feature map; the larger the $P_{deep}$ value, the more accurate the similarity is obtained. After that, it is necessary to reduce the dimension of the $P_{deep}$ axis of M. The dimension of the $P_{deep}$ axis of M may be reduced into a dimension 1, by using the method of finding the average number or the maximum number, so as to obtain $P_{num}$×$P_{num}$ feature maps $M_2$ in a shape of (1, $P_{num}$, $P_{num}$, 1).

As shown in FIG. 6D, the process of coarse recovering of the image by the recovering network further involves masking, and to prevent the mask image from being considered as the most similar patch, the mask region is necessary to be labeled at the A-wSM position. It is necessary to reduce the mask image from the input size to (1, $P_{num}$, $P_{num}$, 1). Moreover, considering a problem that the down-sampling time rate is too high, if the mask image is down-sampled by using a method such as interpolation, bilinear or nearest neighbor, the area of the mask will become relatively small, and thus the filled results on the boundary of the mask region will be lost. Therefore, some embodiments propose an Extract Patch Resize method to down-sample the mask to (1, $P_{num}$, $P_{num}$, 1). For example, if the down-sampled region comprises at least one valid value, the Extract Patch Resize method labels the position as valid. The processing of this process is expressed as shown in Equation (1) below.

$$M_{att} = \begin{cases} 1, \text{ if } \operatorname{sum}(M_{Patch_i}) > 0 \\ 0, \text{ otherwise} \end{cases} \quad \text{[Eq. 1]}$$

Referring to Equation 1, $M_{Patch_i}$ denotes the i-th patch of the input mask image $M_{in}$, and each patch size is $M_{in}/P_{num}$. $M_{att}$ refers to a mask size of the attention score map. That is, when $M_{att}$=1, the position corresponding to the patch is denoted as valid; when $M_{att}$=0, the other positions are denoted as invalid.

The operation of labeling the mask is as shown in Equation (2) below.

$$C\text{-}wAM_i = C\text{-}wAM_i \times M_{att} + \alpha \times (1 - M_{att}) \quad \text{[Eq. 2]}$$

Referring to Equation 2, C-w$AM_i$ denotes the i-th feature map $M_2$ in a shape of (1, $P_{num}$, $P_{num}$, 1). After labeling the $P_{num}$×$P_{num}$ feature maps $M_2$, the $P_{num}$×$P_{num}$ feature maps C-w$AM_i$ in a shape of (1, $P_{num}$, $P_{num}$, 1) are concatenated at the fourth dimension to obtain the A-wSM in a shape of (1, $P_{num}$, $P_{num}$, $P_{num}$×$P_{num}$). The a is a configured parameter.

$I_{res}$ is denoted as the residual image, where h and w are the corresponding height and width of this residual image. The $I_{res}$ is split into $P_{num}$×$P_{num}$ patch images, where the image size of each patch image is $$\left(\frac{h}{P_{num}}\right)\times\left(\frac{w}{P_{num}}\right).$$

The (x, y) is denoted as coordinates of each patch image in a matrix $P_{num}$×$P_{num}$, where an origin of the coordinates (x, y) is in the upper left corner. The $F_{as}$ represents the A-wSMs, which comprise $P_{num}$×$P_{num}$ attention score maps in a shape of (1, $P_{num}$, $P_{num}$, 1). The $F_{as_i}$ is denoted as the i-th attention score map in a shape of (1, $P_{num}$, $P_{num}$, 1). Therefore, a feature score map corresponding to the (x×$P_{num}$+y)-th patch image is $F_{as_i}$, where i=x×$P_{num}$+y. Furthermore, $F_{as_i}$ may be transformed into a matrix in a size of $P_{num}$×$P_{num}$. As such, the coordinates of the minimum value (e.g., whether to take the minimum value or not is related to the loss function used in some embodiments) are found in the $F_{as_i}$. That is, the coordinates of the most similar region of the (x×$P_{num}$+y)-th patch image are obtained. Therefore, the C-wAM model may fill the patches within the target region (also called the missing region), by finding the minimum value of similarity in the array instead of a huge computational amount for matrix multiplication in the previous CA of related techniques, so as to reduce the computational amount. Moreover, $M_{att}$ is defined as a mask image in a shape of (1, $P_{num}$, $P_{num}$, 1), which labels the mask region, so as to reduce the redundant operations, by pasting the patches of the residual image only in the mask region.

In an embodiment, the process of pasting similar patch images is as follows.

First, the parameters are defined as follows: $I_{res}$ is an input residual image; $M_{att}$ is a mask size of the attention score map; $P_{num}$ is the number of patch images per column or per row; $F_{as}$ is an attention score map; and Ores is an aggregated residual image.

Upon pasting, for an x corresponding to a value range (0, $P_{num}$) and a y corresponding to the value range (0, $P_{num}$), when $M_{att}$ at the position (x, y) is equal to 0, it means that the patch at the position (x, y) of the $I_{res}$ image is not in the missing region, so no operation is required and the patch at the next position is continued to be observed. Alternatively or additionally, when $M_{att}$ at the position (x, y) is not equal to 0, it means that the patch at the position (x, y) of the $I_{res}$ image is a patch in the missing region, and thus the patch is necessary to be pasted. And then, extract the feature map $F_{as_i}$, and find the coordinates of the minimum value in the feature map, and assign the coordinates to (xt, yt). Then, coordinate map the coordinates (xt, yt) to the $I_{res}$ image, and find the patch at the position (xt, yt) of the $I_{res}$ image, and paste the patch to a patch region at coordinates (x, y) in the $I_{res}$ image, so as to finish pasting one patch region, and repeat the above operations to finish pasting all patches.

A training method of C-wAM is given below.

Specifically, the loss functions used during training the C-wAM network are expressed as shown in Equation (3) below.

$$L = \lambda_1 L_{prc} + \lambda_2 L_{style} + \lambda_3 L_{att} + \lambda_4 L_1 + \lambda_5 L_{adv} \quad \text{[Eq. 3]}$$

Referring to Equation 3, λ is a weight coefficient of each loss, $L_{prc}$ and $L_{style}$ are the same losses as the local convolution of the relevant technique, $L_{att}$ is the attention loss provided in the present disclosure, $L_1$ is the L1 loss, and Lady is the loss of Deepfillv2 image recovering.

The attention loss provided in some embodiments is described as follows. The attention loss is the sum of all magnitudes or absolute differences between the C-wAM output and the ground truth (labeling), which is approximates the A-wSM, and which is generated by using the VGG (Visual Geometry Group) network. Given a group $$I^{gt}=\{I_1^{gt}, \ldots, I_n^{gt}\}$$

of approximate labeling, and the output $$I^{gen}=\{I_1^{gen}, \ldots, I_n^{gen}\}$$

of the patch network, the attention loss $L_{att}$ is expressed as shown in Equation (4) below.

$$L_{att}=\sum_{i=1}^{N}\frac{\|I_i^{gen}-I_i^{gt}\|}{N} \quad \text{[Eq. 4]}$$

Referring to Equation 4, N denotes the number of all extracted patches;

$$I_i^{gen}$$

denotes the i-th A-wSM generated by the patch network; and $$I_i^{gt}$$

denotes the i-th labeled feature map obtained by the VGG network.

$$I_i^{gt}$$

expresses the following equation (5).

$$I_i^{gt}=M\odot\alpha+\left|\Psi^l(X_{gt})-\Phi_i^l(\Psi^l(X_{ipt}))\right|\odot(1-M) \quad \text{[Eq. 5]}$$

Referring to Equation 5, α is an coefficient for avoiding the mask region value interfering with the attention score feature map configuration, M is a mask in a size of $P_{num}\times P_{num}$ obtained by the extracted patch resizing method, $X_{gt}$ is the original image in a size of 256×256, ⊙ denotes a multiplication product, $\Psi^1$ is a feature map of a pooling layer of 1 when $X_{gt}$ is given, and 1 equals to $\log_2(256/P_{num})$, $X_{ipt}$ is the output of the image recovering network generated from the resized 256×256 image, where $\Psi^i$ is defined as follows in Equation (6) shown below.

$$\Phi_i^l(I)=\text{Tile}(\text{Extract}_i(I)) \quad \text{[Eq. 6]}$$

Referring to Equation 6, $\text{Extract}_i$(I) denotes the i-th extracted patch in a size of 1×1, Tile (I) denotes tiling the patch in a size of $P_{num}\times P_{num}$.

For example, some embodiments train the provided C-wAM end-to-end by the above defined attention loss function.

Figure 16:
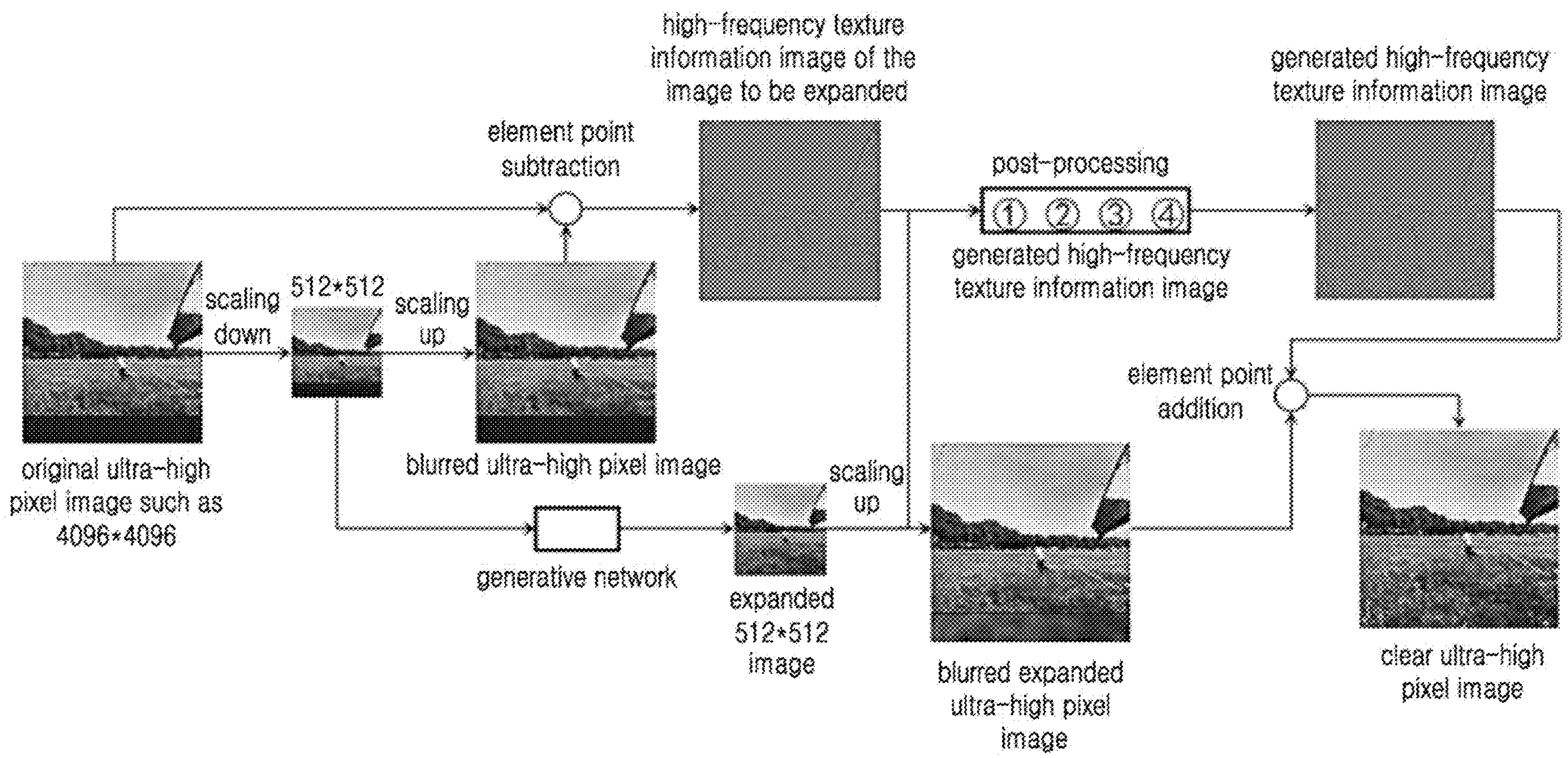
FIG. 16 is a schematic diagram of the overall flow of the post-processing, according to an embodiment.

In some embodiments, considering problems such as low robustness for determining similarity information between images according to cosine similarity, as well as, an increasing computational overhead in the processing of the feature map of similarity results as the density of patches (second images) increases, based on the contextual attention mechanism, as well as, the increased computational amount of pasting patches based on the contextual attention mechanism, some embodiments provide an improved post-processing technique when compared to related post-processing techniques, as shown in FIG. 16. For example, the original image is scaled down and then scaled up back to the original size, and then an element point subtraction operation is performed to the two images so as to obtain a high frequency texture information image with expanded images. The scaled down 512×512 image is input to the generative network (which may correspond to the generative network shown in FIG. 10) so as to obtain the expanded 512×512 image (e.g., the first image). The expanded 512×512 image and the high-frequency texture information image of the image to be expanded (the image to be filled) are input to a post-processing session, where the post-processing session comprises 4 main parts: ① tiling the patch images (second images), ② calculating the attention map by using the patch network, ③ pasting the high-frequency information region, and ④ enhancing the high-frequency information network. The output of the post-processing generates the high-frequency texture information image, and then the high-frequency texture information image is combined with the blurred ultra-high pixel image obtained by 512×512 scaling up, so as to obtain the final clear ultra-high pixel image, and the overall process is as shown in FIG. 16.

In some embodiments, in the step S102 of FIG. 1, determining the target images associated with the second images in the first image, based on the image similarity value determined by the convolutional neural network, comprises performing the following operations of steps D1-D2 for each second image (not shown).

Step D1 may include tiling the second image, to obtain a fourth image with the same image size as a size of the first image.

Step D2 may include determining a target image having the highest similarity to the second image in the first image by a convolutional neural network, based on the fourth image.

Figure 17:
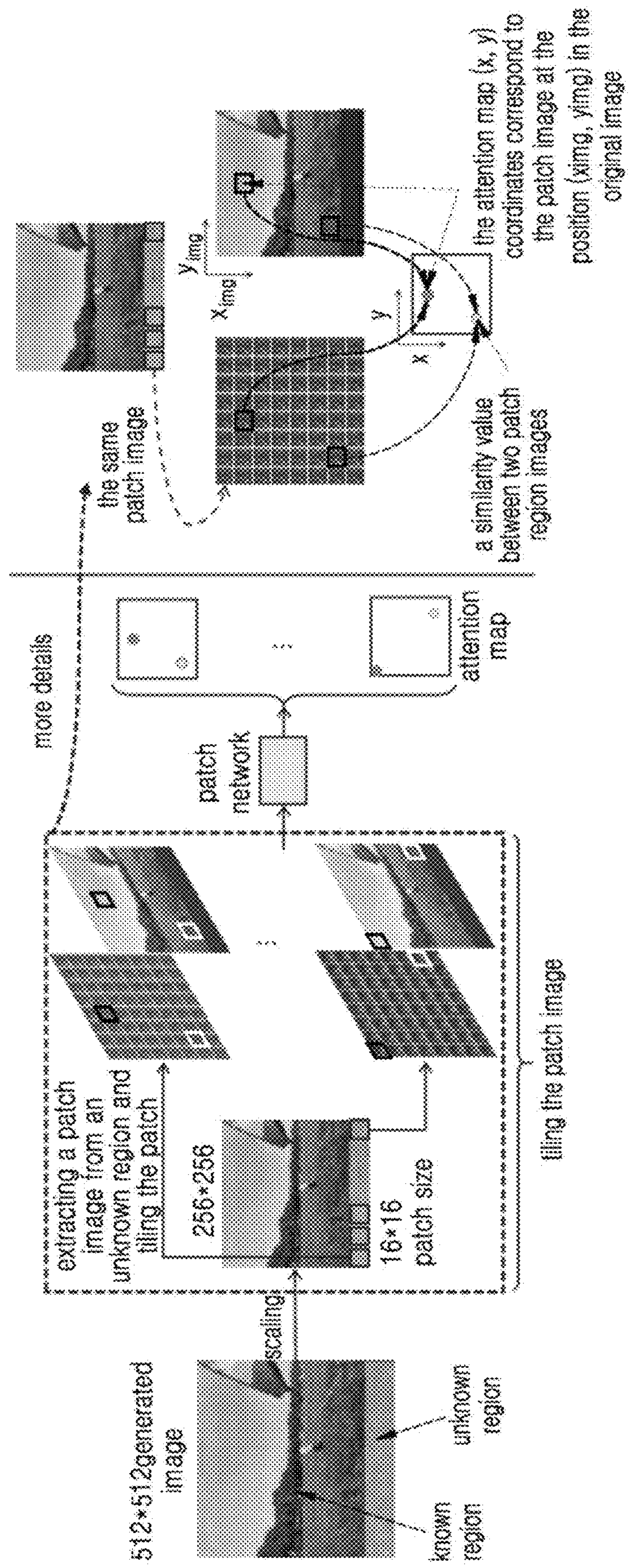
FIG. 17 is a schematic diagram of the processing flow of patch tiling, according to an embodiment.
Figure 18:
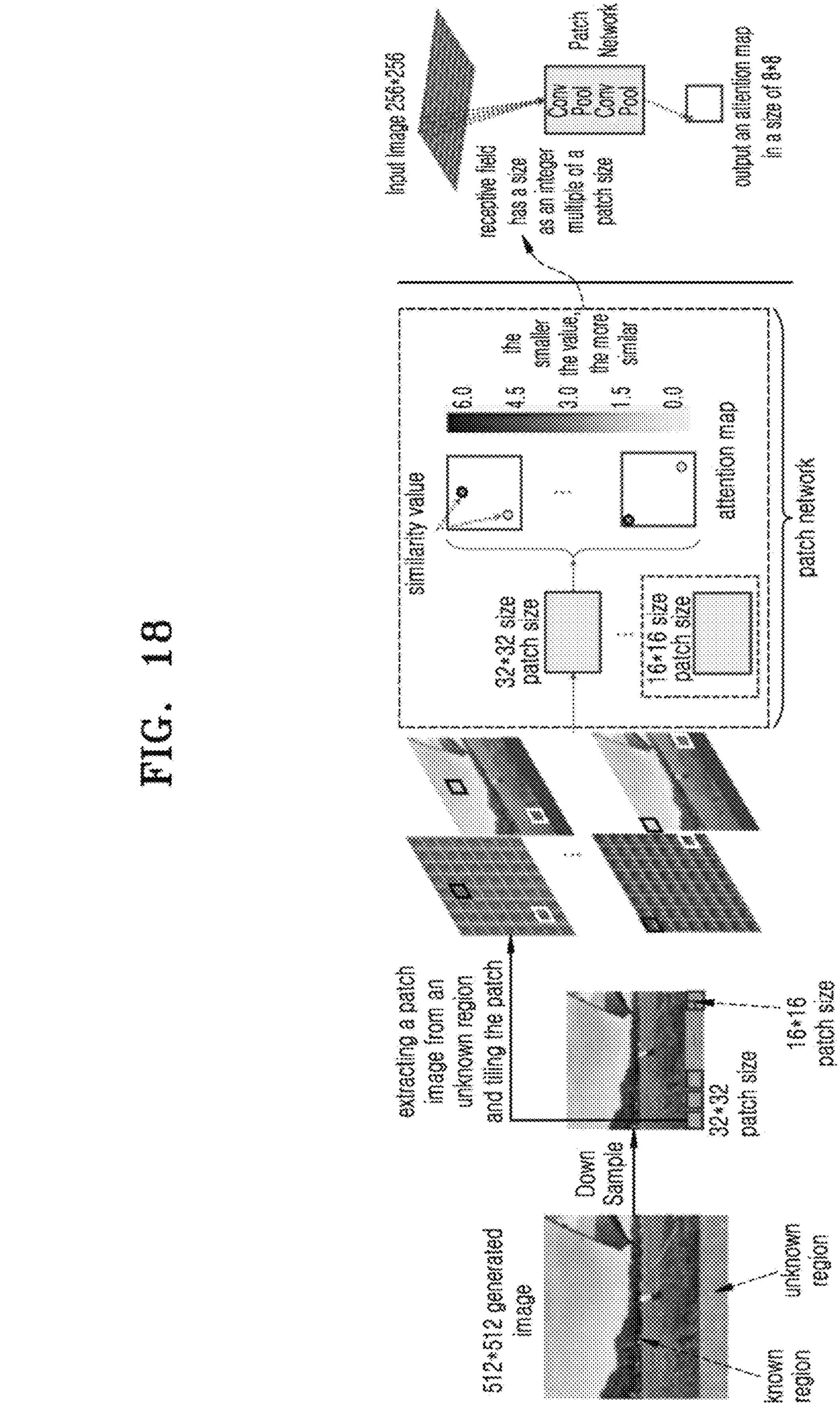
FIG. 18 is a schematic diagram of the processing process, based on the patch network, according to an embodiment.

For example, the first image of 512×512 generated in the image complementation stage is scaled down to a size of 256×256, as shown in FIG. 17. The known region in FIG. 17 is an original image region (e.g., an image before editing), that is, an image obtained after scaling down and up. The unknown region is a region generated by the image complementation network (e.g., the target region), that is, the missing region in the original image that is necessary to be complemented. The patch images (e.g., the second images) are extracted from the unknown region sequentially, and are tiled into an image in the same size as the complemented image (e.g., the fourth image, as shown in the tiled patch images in FIG. 17), so as to obtain a plurality of image pairs, as shown in FIG. 18, comprising the patch image and the original image, from different positions in the unknown region. After the patch network, the attention map is output. The attention map (x, y) coordinates correspond to the patch image at the position ($x_{img}$, $y_{img}$) in the original image.

As shown in FIG. 18, the patch network is an image classification network, with N pairs of tiled images and scaled original images as input, and N attention maps as output. The input image is in a size of 256×256, and the output is a feature map in a size of 8×8. The receptive field size of each point on the feature map in the patch network is an integer multiple of the previously extracted patch image. The patch network comprises a convolution operation, or a convolution plus pooling operation. Because the patch network convolution is calculated by moving the sliding window, when the sliding window slides across the tiled images and the scaled original image sequentially, a result is calculated as a similarity value between the patch images and the corresponding positions in the original image. Because the patch network is a trained network, and does not contain artificially defined evaluation criteria, it may exhibit more robustness when compared to related image processing techniques. Moreover, patch sizes with different sizes may be extracted, and may be input to different patch networks, so as to output attention maps with different sizes.

Alternatively or additionally, in step S103 of FIG. 1, performing a first filling processing of the first image based on the second images and the target images comprises step D3 (not shown).

Step D3 may include filling the target images to the corresponding positions of the second images in the first image.

Figure 19:
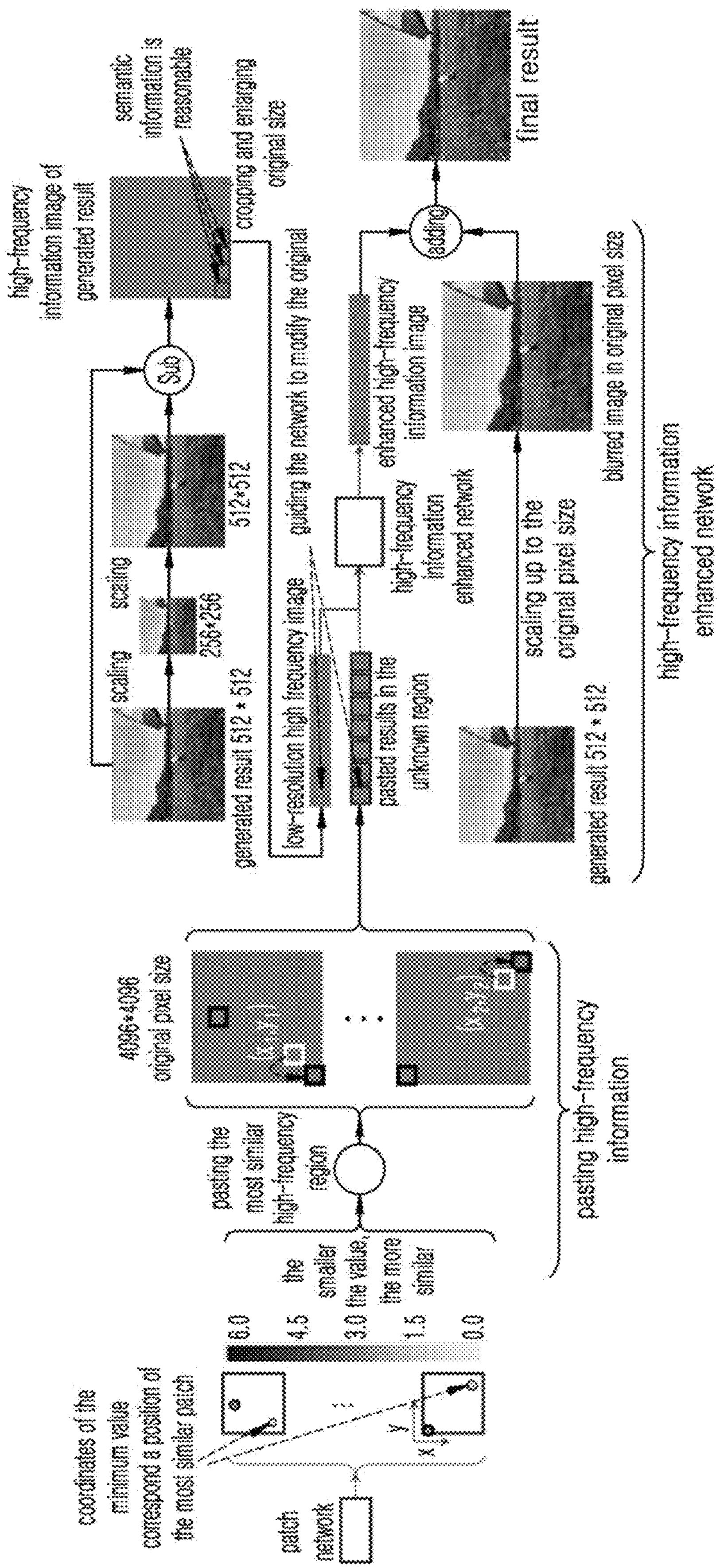
FIG. 19 is a schematic diagram of pasting high frequency information and high frequency information enhanced network, according to an embodiment.

For example, as shown in FIG. 19, the point with the minimum value (the coordinates with the minimum value corresponds to the position of the most similar patch) is firstly found from the attention map. The patch region corresponding to the high frequency information image (the target image) is found, based on the coordinates of the point. The target image corresponding to the patch region is pasted to the unknown region (at a position corresponding to the second image). For example, the coordinates with the minimum value are (x, y), which correspond to a position (x1, y1) in the original image. And then the high-frequency information image (x1, y1) obtained from the original image is pasted to the corresponding unknown region. The remaining unknown regions are pasted with the high-frequency information image in the above operations sequentially.

In some embodiments, considering that a ghosting phenomenon may occur in some scenes because of direct pasting of high-frequency information, some embodiments further provide a high-frequency information enhanced network so as to reduce the effect of the ghosting phenomenon. The extracted generated high-frequency information image (the target image extracted from the first image) in a size of 512×512 is not as rich in high-frequency information as the original image (e.g., the image before editing), but there is no semantic unreasonable problem; and thus, the high-frequency information enhanced network provided by the present disclosure may be enhanced for processing, based on this high-frequency information image.

For example, after performing the first filling processing in step S103, steps E1-step E2 are further included (not shown).

Step E1 may include acquiring the fifth images corresponding to regions where the plurality of the second images are located, based on the first image.

For example, the first image may be an image obtained by generative network processing or by image recovering processing (e.g., an image obtained by second filling processing). The fifth images corresponding to the target regions corresponding to all the second images may be acquired, based on the first image.

Alternatively or additionally, acquiring the fifth images corresponding to regions where the plurality of the second images are located, based on the first image, may include performing a scaling down and scaling up operation on the first image, so as to obtain a seventh image, determining an eighth image, based on the first image and the seventh image, and acquiring the fifth images corresponding to the plurality of second images, based on the eighth image.

For example, as shown in FIG. 19, the 512×512 result generated by the generative network is scaled down to a size of 256×256, and then this 256×256 image is scaled up to a size of 512×512 (to obtain the seventh image). And then, the first image and the seventh image are subjected to an element point subtraction operation so as to obtain a high frequency information image (the eighth image) of the generated result with a pixel size of 512×512. Therefore, the region corresponding to the original high-frequency information image may be cropped in the high-frequency information image of generated result, and is noted as a low resolution high-frequency information image, and then is scaled up to the pixel size of the result pasted in the unknown region. For example, the original pixel size in FIG. 19 is 4096×4096, and the result cropped in the generated high-frequency information image is necessary to be scaled up 16 times. That is, the fifth images corresponding to the target regions may be obtained, based on the first image. Although, the high-frequency information of the generated result generated by the generative network is not as rich as the original image, its semantic information may be reasonable, and thus, the semantic information may be used so as to guide the network to modify the original high-frequency information image, so as to reduce the ghosting problem.

Step E2 may include acquiring sixth images corresponding to a plurality of the second images, in the first image after the first filling process.

For example, as shown in FIG. 19, the result of pasting the unknown regions (target regions) may be obtained by cropping in the 4096×4096 image corresponding to the processed result of pasting the high-frequency information. That is, the sixth images corresponding to the target regions may be obtained in the first image after the first filling process.

Step E3 may include determining the target filled image, based on the fifth images and the sixth images.

For example, a convolution operation may be performed on the fifth images and the sixth images by the enhanced network, so as to obtain the target filled image. The high frequency information enhanced network structure is a U-net structure, and may comprise a gated convolution (gated convolution).

Figure 20:
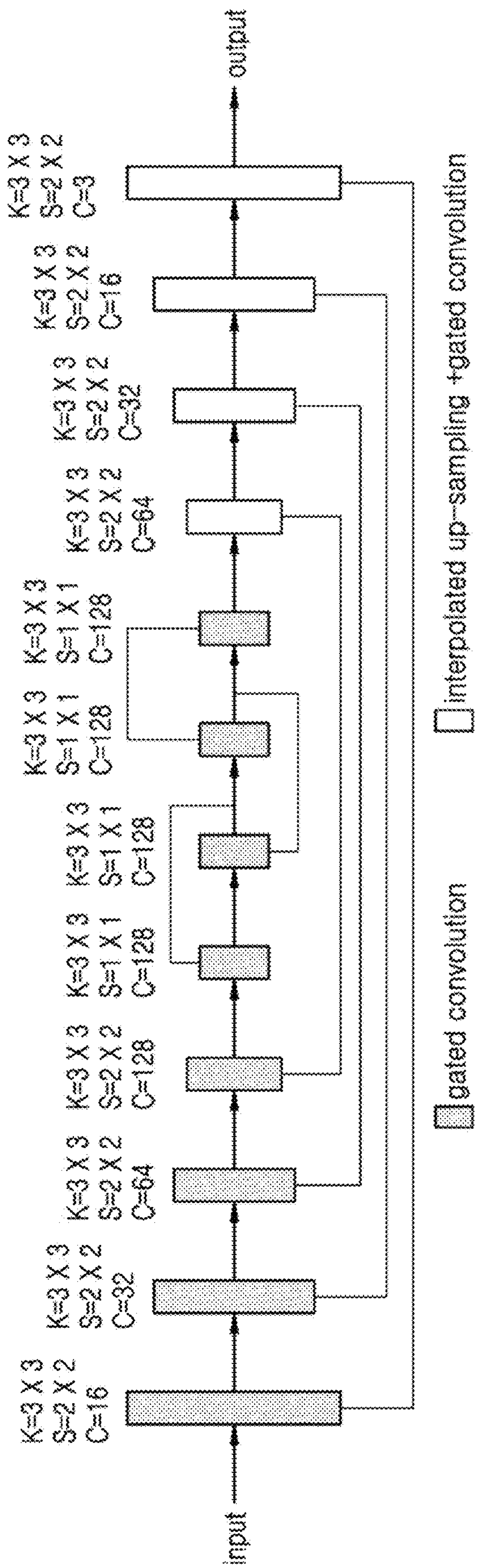
FIG. 20 is a schematic diagram of a high frequency information enhanced network, according to an embodiment.

As shown in FIG. 20, the post-processed high frequency information enhanced network structure is a U-net structure that may contain a gated convolution and is connected for each module using a skip connection (e.g., a residual connection in a residual network).

Alternatively or additionally, the enhanced network comprises a down-sampling module, a residual block and an up-sampling module connected sequentially. The down-sampling module comprises a plurality of first gated convolution layers connected sequentially. The residual block comprises a plurality of second gated convolution layers connected sequentially. The second gated convolution layers further comprise a skip connection structure between them. The up-sampling module comprises a plurality of third gated convolution layers connected sequentially. The third gated convolutional layers are connected to the first gated convolutional layers in the corresponding layers.

As shown in FIG. 20, the enhanced network may perform 4 down-sampling operations by using 4 layers of first gated convolutional layers in the down-sampling module. And then 4 gated convolutions are performed by 4 layers of second gated convolutional layers in the residual block. Residual connections are used in the middle of these 4 convolutions, so as to ensure that as much high frequency information as possible is retained. And then 4 up-sampling operations are performed by 4 layers of third gated convolutional layers in the up-sampling module. Whenever each up-sampling is performed, an interpolation method such as a bicubic interpolation, and a bilinear interpolation is used. Alternatively or additionally, a gated convolution is used after the interpolation. Alternatively or additionally, before each interpolation, inputting a feature map (e.g., an output of the first gated convolution layer) in the same size for down-sampling. It may be understood that the number of the gated convolution layers laid out by the down-sampling module and the number of the gated convolution layers laid out by the up-sampling module are corresponding to each other. And the 4 layers shown in FIG. 20 are only used as an example, and the number of layers may be adjusted according to the actual requirements.

Figure 21:
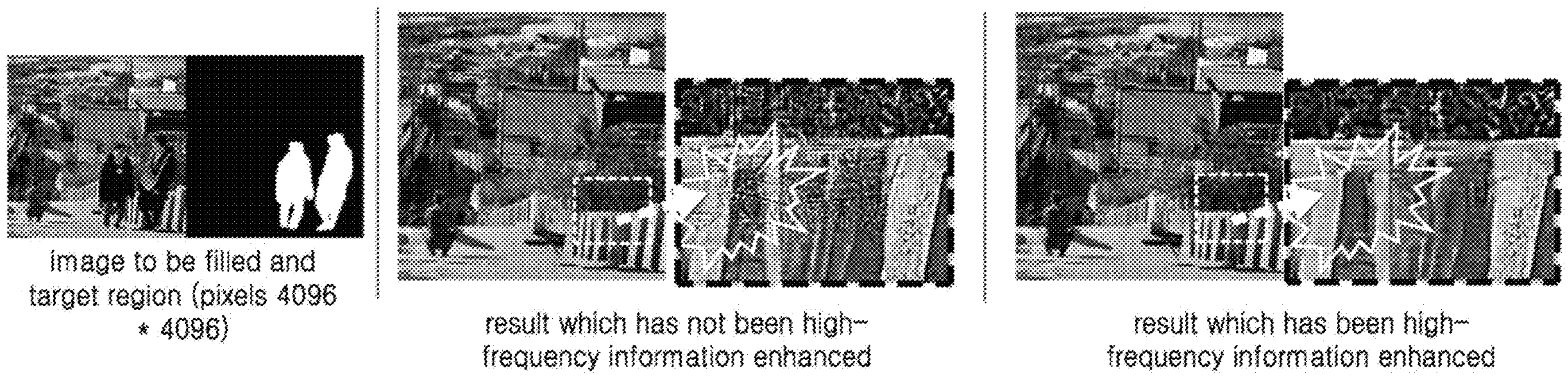
FIG. 21 is a comparison diagram of the results of texturing high frequency information, according to an embodiment.

In some embodiments, the use of a plurality of residual connections (skip connection) in the high frequency information enhanced network may retain as much high frequency information in the input data as possible. As shown in FIG. 21, the ghosting problem may be significantly addressed after performing the enhancement process by the high-frequency information enhanced network provided in some embodiments.

Step E4 may include determining an image obtained after the image processing, based on the target filled image and the first image.

For example, as shown in FIG. 19, the pasted result (e.g., the sixth images) in the unknown region and the low-resolution high-frequency information (e.g., the fifth images) may be input to the high-frequency information enhanced network, so as to obtain the enhanced high-frequency information image (the target filled image). And then the enhanced high-frequency information image is added to the blurred map (obtained by enlarging the generated result, based on the output of the generative network) in an original pixel size, so as to obtain the final result of the image processing.

An application example is given below in conjunction with FIG. 2 and FIG. 8.

Figure 8:
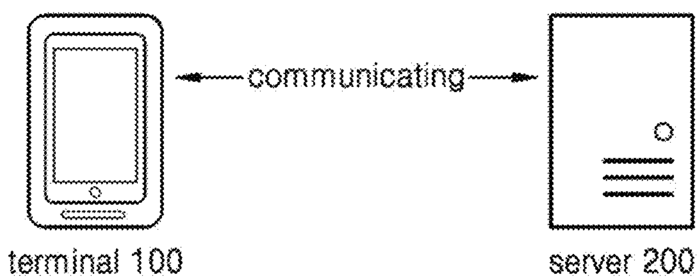
FIG. 8 is a schematic diagram of an operating environment, according to an embodiment.

As shown in FIG. 8, the image processing method provided in some embodiments may be executed by using a terminal 100 or a server 200.

Alternatively or additionally, when the terminal 100 is employed to perform the image processing method provided in some embodiments, the first image to be processed may be an image currently shot and input by the user, or an image to be processed obtained from another terminal (e.g., a terminal employed by a user A transmits the image to be processed to the terminal employed by a user B via a connection such as Bluetooth), or the first image obtained from the server 200.

Alternatively or additionally, when the server 200 is employed to perform the image processing method provided by the embodiment of the present disclosure, the image to be processed is obtained from the terminal 100. And then, after the image processing step is performed by the server 200, the result image obtained by the image processing is fed back to the terminal 100.

As shown in FIG. 2, the image processing network provided by the present disclosure comprises a similarity calculation network module. And a similarity feature map is calculated by the similarity calculation network module, for the third image obtained by tiling the second images. Compared with the related technology that uses cosine similarity to find the similar images of the second images, the present disclosure performs the finding by the network model, and outputs the similarity feature map, so as to transform the determining factor of computing similarity values from the original density of the second images to the number of parameters of the network, and to facilitate reducing the computational complexity. Moreover, when performing the first filling processing, the height and width of the second images corresponding to the similarity feature map provided in some embodiments corresponds to the image positions in the target region one by one. That is, as shown in FIG. 3, the channel order of the second images in the target region and the channel order of the second images in the third image corresponds to each other. Therefore, the target positions corresponding to the filling may be found quickly in the present disclosure, so as to reduce the time required to find the target positions (e.g., the positions of filling the second images). Because the similarity feature map provided in some embodiments comprises not only the similarity value but also the position information, image information and other information, it is unnecessary for the present disclosure to perform the deconvolution operation to complete the pasting operation. Therefore, the computational complexity of the first filling processing is related to the similarity feature map, but is not related to the size of the first image, so as to facilitate significantly reducing the computational complexity.

Figure 22:
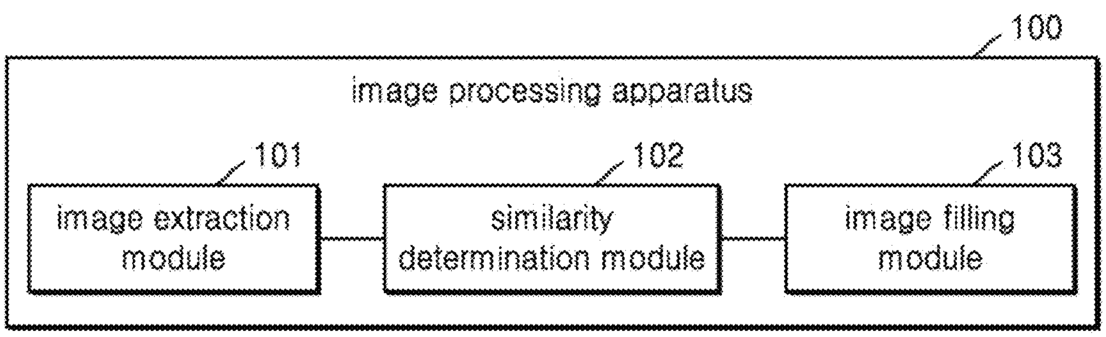
FIG. 22 is a schematic diagram of the structure of an image processing apparatus, according to an embodiment.

An embodiment of the present disclosure provides an image processing apparatus, as shown in FIG. 22. The image processing apparatus 100 may include an image extraction module 101, a similarity determination module 102, and an image filling module 103.

The image extraction module 101 is configured to perform image extraction on an acquired first image to obtain a plurality of second images; the similarity determination module 102 is configured to determine target images associated with the second images in the first image, based on the image similarity value determined by the convolutional neural network; and the image filling module 103 is configured to perform a first filling processing of the first image, based on the second images and the target images.

In an embodiment, the image extraction module 101 is configured to perform an image extraction on the acquired first image to obtain a plurality of second images when specifically configured to acquire a first image, which is an image processed by second filling processing. The device 100 may further comprise an initial processing module configured to perform the second filling processing. For example, the initial processing module may be configured to determine, in the image to be filled, a target region, in response to an editing operation, and perform a second filling processing on the target region by using image information included in the image to be filled, so as to obtain the first image.

The image extraction module 101 may be further configured to perform an image extraction from the target region of the first image to obtain a plurality of second images.

In an embodiment, when the initial processing module is configured to determine the target region in the image to be filled in response to the editing operation, the initial processing module may be further configured to determine the image to be filled based on the image before editing, in response to the editing operation, and determine a region of the image to be filled that does not comprise any image information as the target region.

In an embodiment, the initial processing module, prior to being configured to perform a second filling processing on the target region by using image information included in the image to be filled, may be further configured to crop and/or scale the image to be filled, based on a predetermined image area.

In an embodiment, when the initial processing module is configured to perform crop and/or scale of the image to be filled, based on the predetermined image area, the initial processing module may be further configured to, when an area of the image to be filled is larger than the predetermined image area, crop the image to be filled, and, when the area of the cropped image to be filled is larger than the predetermined image area, scale down the area of such cropped image to be filled to the predetermined image area.

In an embodiment, the initial processing module, when configured to perform crop of the image to be filled, may be further configured to calculate maximum connected component in a mask image corresponding to the image to be filled, and crop the image to be filled, based on minimum bounding squares corresponding to the maximum connected component, to obtain at least one cropped image to be filled.

In an embodiment, the initial processing module, when configured to perform a second filling processing of the target region by using image information included in the image to be filled, so as to obtain the first image, may be further configured to sequentially perform at least one down-sampling operation and at least one up-sampling operation for the image to be filled, so as to obtain the first image, wherein, upon each execution of a down-sampling operation, perform a dilated convolution operation for the feature map obtained by down-sampling, based on a different dilation rate.

In an embodiment, the initial processing module, when configured to perform the dilated convolution operation for the feature map obtained by down-sampling, based on the different dilation rate, may be further configured to split the feature map obtained by down-sampling into at least one sub-feature map, based on a predetermined number of dilated convolutions, perform feature extraction from different sub-feature maps by using different dilation rates, and determine an output of a dilated convolution, based on a feature extraction result of the sub-feature maps.

In an embodiment, the initial processing module, when configured to perform determining the output of the dilated convolution, based on the feature extraction result of the sub-feature maps, may be further configured to perform a summing operation for a feature extraction result of the sub-feature maps so as to obtain a plurality of pieces of superimposed information, concatenate the pieces of superimposed information, and determine the output of the dilated convolution, based on the concatenated superimposed information, wherein the summing operation comprises summing a feature extraction result of a current sub-feature map with a result obtained from a previous summing operation, so as to obtain the superimposed information associated with the current sub-feature map.

In an embodiment, the image extraction module 101, when configured to perform an image extraction of a target region of the first image to obtain a plurality of second images, may be further configured to perform image extraction from the target region of the first image, based on a predetermined first image size and a predetermined image extraction order, so as to obtain a plurality of second images.

In an embodiment, the similarity determination module 102, when configured to determine, in the first image, the target images associated with the second images, based on the image similarity value determined by the convolutional neural network, may be further configured to perform the following operations for each second image: tile the second image to obtain a third image with an image size corresponding to the target region, calculate a similarity value of the second image relative to other second images, based on the third image, by a convolutional neural network, so as to obtain a similarity feature map, and determine, the target position in the target region of the target image, with the highest similarity to the second image, based on the similarity feature map.

The image filling module 103, when configured to perform first filling processing of the first image, based on the second images and the target images, may be further configured to fill the second image to the target position.

In an embodiment, prior to configured to calculate the similarity value of the second image with other second images, based on the third image via a convolutional neural network, the image filling module 103 may be further configured to transform the third image, based on a predetermined second image size, so as to obtain a transformed third image, down-sample the transformed third image, based on the predetermined first image size and the predetermined second image size, so as to obtain the down-sampled third image, wherein the first image size is a size for extracting a second image in a target region of the first image.

In an embodiment, the similarity determination module 102, when configured to determine, in the first image, the target images associated with the second images, based on the image similarity value determined by the convolutional neural network, may be further configured to perform the following operations for each second image: tile the second image so as to obtain a fourth image with an image size the same as a size of the first image, and determine, in the first image, the target image, with the highest similarity to the second image, based on the fourth image, by a convolutional neural network.

The image filling module 103, when configured to perform a first filling processing of the first image, based on the second images and the target images, may be further configured to fill the target image to a corresponding position of the second image in the first image.

In an embodiment, the image filling module 103, after configured to perform the first filling processing, may be further configured to acquire fifth images corresponding to regions where the plurality of second images are located, based on the first image, acquire sixth images corresponding to the plurality of second images from the first image processed by the first filling processing determine a target filled image, based on the fifth images and the sixth images, and determine an image obtained after the image processing, based on the target filled image and the first image.

In an embodiment, the image filling module 103, when performing the acquisition of fifth images corresponding to the regions where the plurality of second images are located, based on the first image, may be further configured to perform a scaling down and scaling up operation on the first image, so as to obtain a seventh image, determine an eighth image, based on the first image and the seventh image, and acquire the fifth images corresponding to the plurality of second images, based on the eighth image.

In an embodiment, the image filling module 103, when configured to determine the target filled image, based on the fifth images and the sixth images, may be further configured to perform a convolution operation on the fifth images and the sixth images by an enhanced network, so as to obtain the target filled image, wherein the enhanced network comprises a down-sampling module, a residual block and an up-sampling module connected sequentially. The down-sampling module comprises a plurality of first gated convolution layers connected sequentially. The residual block comprises a plurality of second gated convolution layers connected sequentially. The second gated convolution layers further comprise a skip connection structure between each other. The up-sampling module comprises a plurality of third gated convolution layers connected sequentially. Each third gated convolution layer is connected to the first gated convolutional layers in corresponding levels.

The apparatus of an embodiment of the present disclosure may perform the method provided in some embodiments, and has similar embodiment principles with those of the method, and the actions performed by the modules in the apparatus of an embodiment of the present disclosure correspond to the steps in the method of an embodiment of the present disclosure, and the detailed functional description of the modules of the apparatus may be specifically referred to the description in the corresponding method previously shown herein, which will not be repeated here.

An embodiment of the present disclosure provides an electronic device comprising a memory, at least one processor and a computer program stored in the memory, the processor executing the above-mentioned computer program to perform the steps of the image processing method, which may be achieved in comparison with the prior art: the present disclosure, after acquiring a first image, firstly performing image extraction on the first image to be processed by image processing, so as to obtain a plurality of second images; and then determining, in the first image, target images associated with the second images, based on the image similarity value determined by the convolutional neural network; and then performing a first filling processing of the first image, based on the second images and the target images. The embodiment of the present disclosure may perform image filling, based on the image information included in the first image. Wherein the second images correspond to portions of the first image to be subjected to the first filling processing. The first image may be filled based on the image information included in the first image, in an embodiment of the disclosure. The processing of this solution facilitates quickly understanding the positions of filling, and reducing the computational complexity and shortening the time consuming. Moreover, the similarity value is determined by using a convolutional neural network, and the computation of its similarity value is related to the parameters of the network and not related to the size of the image processed, so as to significantly reduce the computational complexity and thus improve the performance of the image processing.

Figure 23:
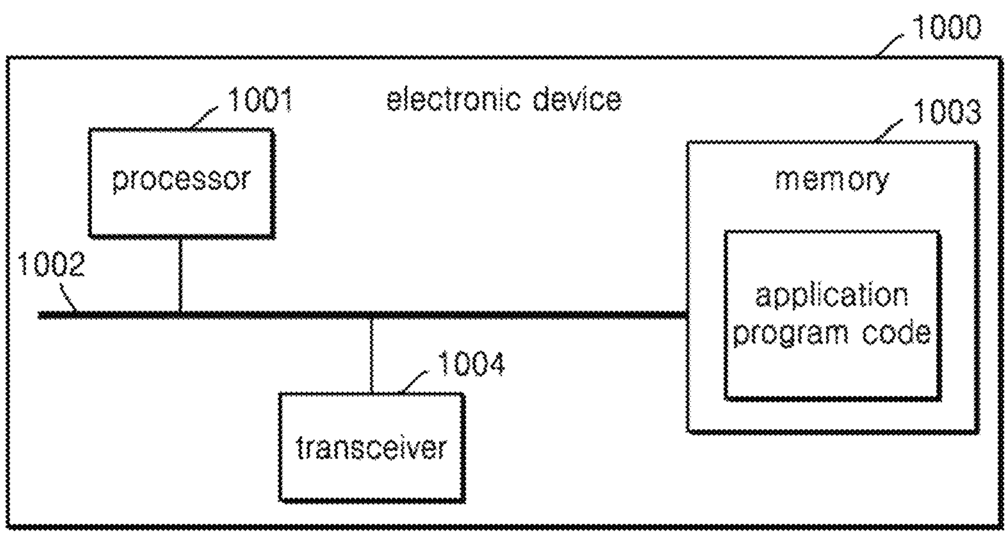
FIG. 23 is a schematic diagram of the structure of an electronic device, according to an embodiment.

In an optional embodiment, an electronic device is provided, as shown in FIG. 23, wherein the electronic device 1000 shown in FIG. 23 comprises at least one processor 1001 and a memory 1003, wherein the processor 1001 and the memory 1003 are connected, e.g., via a bus 1002. Alternatively or additionally, the electronic device 1000 may further comprise a transceiver 1004, which may be used for data interaction between this electronic device and other electronic devices, such as the transmitting of data and/or the receiving of data, etc. It should be noted that the transceiver 1004 is not limited to one in practical applications, and the structure of the electronic device 1000 does not constitute a limitation of an embodiment of the present disclosure.

The processor 1001 may be a CPU (Central Processing Unit), a general purpose processor, a DSP (Digital Signal Processor), an ASIC (Application Specific Integrated Circuit), an FPGA (FPGA), FPGA (Field Programmable Gate Array) or other programmable logic device, a transistorized logic device, a hardware component, or any combination thereof. It may implement or execute various exemplary logic blocks, modules, and circuits described in conjunction with the present disclosure. The processor 1001 may further be a combination that implements a computing function, such as a combination comprising one or more microprocessors, a combination of a DSP and a microprocessor, etc.

The bus 1002 may comprise a pathway to transmit information between the above components. The bus 1002 may be a PCI (Peripheral Component Interconnect) bus or an EISA (Extended Industry Standard Architecture) bus, for example. The bus 1002 may be divided into an address bus, a data bus, a control bus, etc. For the convenience of representation, only one thick line is used in FIG. 23, but it does not mean that there is only one bus or one type of bus.

The memory 1003 may be a ROM (Read Only Memory) or other type of static storage device that may store static information and instructions, a RAM (Random Access Memory) or other type of dynamic storage device that may store information and instructions, or an EEPROM (Electrically Erasable Programmable Read Only Memory), CD-ROM (Compact Disc Read Only Memory) or other optical disc storage, optical disc storage (including compressed disc, laser disc, optical disc, digital universal disc, Blu-ray disc, etc.), disk storage media, other magnetic storage devices, or any other media that may be used to carry or store computer programs and may be read by a computer without limitation here.

The memory 1003 is configured to store a computer program for executing an embodiment of the present disclosure and is controlled for execution by the processor 1001. The processor 1001 is configured to perform the computer program stored in the memory 1003 to perform the steps shown in the preceding method embodiment.

The electronic device 100 may include, but is not limited to smart phones, tablet computers, laptops, smart speakers, smart watches, in-car devices, etc.

Embodiments of the present disclosure provide a computer-readable storage medium on which a computer program is stored, the computer program being executable by at least one processor to perform the steps and corresponding contents of the preceding method embodiments.

Embodiments of the present disclosure further provide a computer program product comprising a computer program, the computer program when executed by at least one processor realizing the steps and corresponding contents of the preceding method embodiments.

The aforementioned image processing method performed by the electronic device in the embodiment provided by the present disclosure may be performed by using an artificial intelligence model.

According to embodiments of the present disclosure, the method performed in the electronic device may obtain output data for recognizing image or image features in an image by using image data or video data as input data for the artificial intelligence model. The artificial intelligence model may be obtained by training. Here, “obtained by training” means that the basic artificial intelligence model is trained with a plurality of training data by a training algorithm to obtain predefined operational rules or artificial intelligence models configured to perform the desired feature (or object). The artificial intelligence model may comprise a plurality of neural network layers. Each layer of the plurality of neural network layers comprises a plurality of weight values and performs neural network computations by computing between the results of the previous layer and the plurality of weight values.

Visual understanding is a technique for recognizing and processing things like human vision and includes, for example, object recognition, object tracking, image retrieval, human recognition, scene recognition, 3D reconstruction/localization, or image enhancement.

The image processing apparatus provided in the present disclosure may be implemented by AI models for at least one of a plurality of modules. The functions associated with the AI may be performed through non-volatile memory, volatile memory, and at least one processor.

The processor may comprise one or more processors. Wherein, the one or more processors may be a general purpose processor, (e.g., central processing unit (CPU), application processor (AP), etc.), or a pure graphics processing unit, (e.g., graphics processing unit (GPU), vision processing unit (VPU), and/or AI-specific processor, (e.g., neural processing unit (NPU)).

The one or more processors control processing of the input data, based on predefined operational rules or artificial intelligence (AI) models stored in non-volatile memory and volatile memory. The predefined operation rules or AI models are provided by training or learning.

Here, providing by learning refers to obtaining predefined operating rules or AI models with desired characteristics by applying a learning algorithm to a plurality of learned data. The learning may be performed in the device itself in which the AI according to the embodiment is executed, and/or may be implemented by a separate server/system.

The AI model may comprise a plurality of neural network layers. Each layer has a plurality of weight values, and the computation of a layer is performed by the results of the computation of the previous layer and the plurality of weights of the current layer. Examples of neural networks include, but are not limited to, convolutional neural networks (CNN), deep neural networks (DNN), recurrent neural networks (RNN), restricted Boltzmann machines (RBM), deep belief networks (DBN), bidirectional recurrent deep neural networks (BRDNN), generative adversarial networks (GAN), and deep Q networks.

A learning algorithm is a method of training a predetermined target device (e.g., a robot) using a plurality of learning data to enable, allow, or control the target device to make determinations or predictions. Examples of the learning algorithm include, but are not limited to, supervised learning, unsupervised learning, semi-supervised learning, or reinforcement learning.

According to an aspect of the disclosure, an electronic device may include a memory storing one or more instructions, and at least one processor communicatively coupled to the memory. According to an embodiment, the at least one processor may be configured to execute the one or more instructions to acquire a target image based on an editing operation on an original image. In an example, the target image may include an unknown region formed by the editing operation. According to an embodiment, the at least one processor may be configured to execute the one or more instructions to perform a filling processing operation on the target image to obtain a first filled image including a first target region. In an example, the first target region may correspond to the unknown region. According to an embodiment, the at least one processor may be configured to execute the one or more instructions to identify a target patch based on the first filled image. In an example, the target patch may correspond to at least a portion of the first target region. According to an embodiment, the at least one processor may be configured to execute the one or more instructions to calculate a similarity value between the target patch and at least one patch related to the first filled image using a first artificial intelligence (AI) model. According to an embodiment, the at least one processor may be configured to execute the one or more instructions to determine a target residual patch corresponding to the target patch based on the similarity value. According to an embodiment, the at least one processor may be configured to execute the one or more instructions to generate a processing result image based on the target residual patch.

According to an embodiment, the at least one processor may be configured to execute the one or more instructions to acquire an edited image by the editing operation on the original image. According to an embodiment, the at least one processor may be configured to execute the one or more instructions to crop the edited image to acquire a cropped image as the target image, when a size of the edited image is larger than the predetermined first size.

According to an embodiment, the at least one processor may be configured to execute the one or more instructions to calculate at least one maximum connected component in a mask image corresponding to the edited image. According to an embodiment, the at least one processor may be configured to execute the one or more instructions to crop the edited image based on at least one minimum bounding square corresponding to the at least one maximum connected component, to obtain at least one cropped image.

According to an embodiment, the at least one processor may be configured to execute the one or more instructions to scale down the target image based on the predetermined second size, when a size of the target image is larger than the predetermined second size. According to an embodiment, the at least one processor may be configured to execute the one or more instructions to generate the first filled image based on the target image scaled down, using a second AI model for image generation (e.g., recovering).

According to an embodiment, the at least one processor may be configured to execute the one or more instructions to generate image data of the unknown region based on the target image using a second AI model for image generation to obtain the first filled image.

According to an embodiment, the second AI model may include at least one down-sampling operation, at least one dilated convolution operation and at least one up-sampling operation. In an example, each of the at least one down-sampling operation may be configured to extract a feature map from input data. In an example, each of the at least one dilated convolution operation may be configured to split an input feature map into at least one sub-feature map, based on a predetermined number of dilated convolutions. In an example, each of the at least one dilated convolution operation may be configured to perform feature extraction from each of the at least one sub-feature map using each dilation rate corresponding to the each of the at least one sub-feature map. In an example, each of the at least one dilated convolution operation may be configured to calculate output data based on a feature extraction result of the each of the at least one sub-feature map.

According to an embodiment, the at least one processor may be configured to execute the one or more instructions to perform at least one summing operation on the feature extraction result of the each of the at least one sub-feature map to obtain a plurality of pieces of superimposed information. According to an embodiment, the at least one processor may be configured to execute the one or more instructions to concatenate the plurality of pieces of superimposed information. According to an embodiment, the at least one processor may be configured to execute the one or more instructions to determine the output data based on the concatenated plurality of pieces of superimposed information. According to an embodiment, the at least one summing operation may include summing a feature extraction result of a current sub-feature map with a result of a previous summing operation, to obtain superimposed information associated with the current sub-feature map.

According to an embodiment, the first AI model may include each sub-network for each patch size. According to an embodiment, the at least one processor may be configured to execute the one or more instructions to calculate the similarity value using a sub-network for a size of the target patch.

According to an embodiment, the at least one processor may be configured to execute the one or more instructions to scale down the first filled image based on a predetermined third size, to obtain a second filled image including a second target region. In an example, the second target region may correspond to the first target region of the first filled image. According to an embodiment, the at least one processor may be configured to execute the one or more instructions to extract the target patch from the second filled image based on at least one predetermined patch size. In an example, the target patch may include at least a portion of the second target region.

According to an embodiment, the at least one processor may be configured to execute the one or more instructions to tile the target patch to generate a tile image comprising a plurality of tiles corresponding to the target patch. In an example, a size of the tile image may be determined based on a size of the second filled image. According to an embodiment, the at least one processor may be configured to execute the one or more instructions to input the tile image and the second filled image with the second target region masked to the first AI model. According to an embodiment, the at least one processor may be configured to execute the one or more instructions to acquire output data of the first AI model including the similarity value between the target patch and at least one patch of the second filled image with the second target region masked.

According to an embodiment, the at least one processor may be configured to execute the one or more instructions to acquire an attention scores map for the target patch. In an example, a value of each position in the attention scores map may indicates a similarity value between the target patch and a patch at the each position in the second filled image with the second target region masked.

According to an embodiment, the at least one processor may be configured to execute the one or more instructions to identify a position with a lowest similarity value in the attention scores map. According to an embodiment, the at least one processor may be configured to execute the one or more instructions to determine the target residual patch in the target image, based on the position with the lowest similarity value.

According to an embodiment, the at least one processor may be configured to execute the one or more instructions to generate a target residual image for the unknown region of the target image, based on the target residual patch. According to an embodiment, the at least one processor may be configured to execute the one or more instructions to generate the processing result image based on the target residual image and the first filled image.

According to an embodiment, the at least one processor may be configured to execute the one or more instructions to generate a first residual image for the unknown region based on the target residual patch. According to an embodiment, the at least one processor may be configured to execute the one or more instructions to generate a second residual image for the unknown region based on the first filled image. According to an embodiment, the at least one processor may be configured to execute the one or more instructions to generate a refined residual image for the unknown region as the target residual image, based on the first residual image and the second residual image.

According to an embodiment, the at least one processor may be configured to execute the one or more instructions to perform at least one of a scaling down operation, a scaling up operation or a subtract operation on the first filled image to generate a low resolution residual image as the second residual image.

Figure 24:
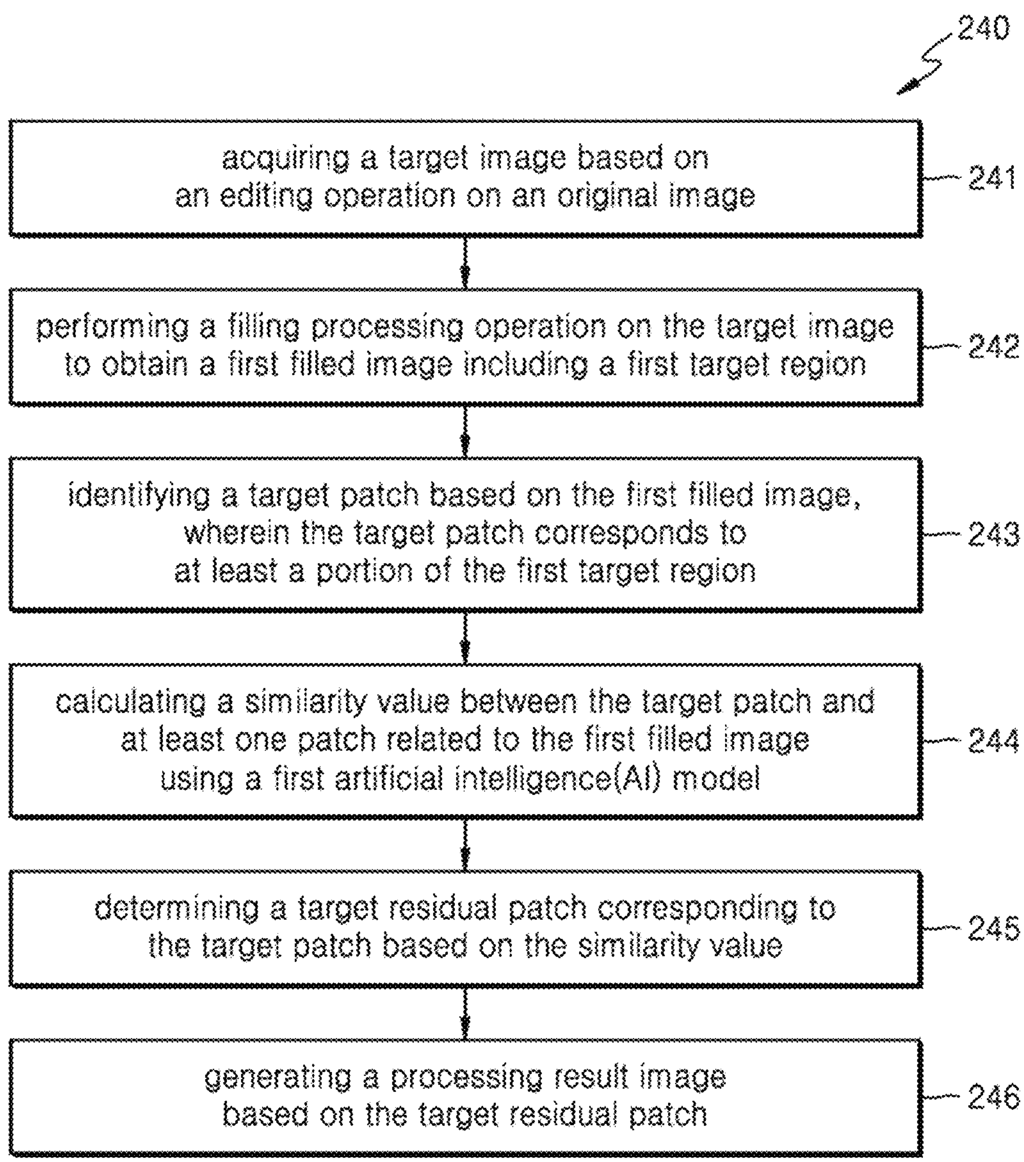
FIG. 24 is a flowchart of an image processing method, according to an embodiment.

According to an embodiment, the at least one processor may be configured to execute the one or more instructions to scale up the first filled image based on a size of the target image. According to an embodiment, the at least one processor may be configured to execute the one or more instructions to add the target residual image to the first filled image scaled up to generate the processing result image. An image processing method is provided in embodiments of the present disclosure, as shown in FIG. 24, which illustrates a flowchart of an exemplary process of an image processing method 240 according to embodiments of the present disclosure. The image processing method 240 may be performed by any electronic device, which may be a user terminal or a server. The user terminal may be a smartphone, a tablet, a laptop, a desktop computer, a smart speaker, a smart watch, a car device, and the like. The server may be an independent physical server. The server may further be a server cluster or a distributed system composed of a plurality of physical servers. The server may further be a cloud server that provides cloud services, cloud database, cloud computing, cloud function, cloud storage, network services, cloud communication, middleware services, domain name services, security services, Content Delivery Network (CDN), and big data and artificial intelligence platform, and other basic cloud computing services of the cloud server. The present disclosure is not limited thereto.

As shown in FIG. 24, the image processing method 240 provided may comprise steps S241-S246.

In step S241, the image processing method 240 may include acquiring a target image based on an editing operation on an original image (e.g., high resolution image, 4096×4096). In an embodiment, the target image may include an unknown region formed by the editing operation. In an example, the target image (e.g., the edited image) may be a result image of the editing operation on the original image. The editing operation may include rotating the image, removing a part of the image, changing the angle of the image, etc. Additionally or alternatively, the target image (e.g., the cropped image) may be at least one image cropped from the edited image by cropping the edited image.

According to an embodiment, the acquiring of the target image may include acquiring an edited image by the editing operation on the original image. According to an embodiment, the acquiring of the target image may include cropping the edited image to acquire a cropped image as the target image when a size of the edited image is larger than the predetermined first size (e.g., 512×512).

According to an embodiment, the cropping of the edited image may include calculating at least one maximum connected component in a mask image corresponding to the edited image. According to an embodiment, the cropping of the edited image may include cropping the edited image based on at least one minimum bounding square corresponding to the at least one maximum connected component, to obtain at least one cropped image.

In step S242, the image processing method 240 may include performing a filling processing operation on the target image to obtain a first filled image including a first target region. In an embodiment, the first target region may correspond to the unknown region.

According to an embodiment, the performing of the filling processing operation on the target image may include scaling down the target image based on the predetermined second size (e.g., 512×512) when a size of the target image is larger than the predetermined second size. According to an embodiment, the performing of the filling processing operation on the target image may include generating the first filled image based on the target image scaled down, using a second AI model for image generation.

In an embodiment, the performing of the filling processing operation on the target image may include generating image data of the unknown region based on the target image using a second AI model for image generation to obtain the first filled image (e.g., expanded result). In an example, the second AI model may include at least one down-sampling operation, at least one dilated convolution operation and at least one up-sampling operation.

In an embodiment, each of the at least one down-sampling operation may be configured to extract a feature map from input data. In an embodiment, each of the at least one dilated convolution operation may be configured to split an input feature map into at least one sub-feature map, based on a predetermined number of dilated convolutions. In an embodiment, each of the at least one dilated convolution operation may be configured to perform feature extraction from each of the at least one sub-feature map using each dilation rate corresponding to the each of the at least one sub-feature map. In an embodiment, each of the at least one dilated convolution operation may be configured to calculate output data based on a feature extraction result of the each of the at least one sub-feature map.

In an example, the calculating of the output data may include performing at least one summing operation on the feature extraction result of the each of the at least one sub-feature map to obtain a plurality of pieces of superimposed information. For example, the at least one summing operation may include summing a feature extraction result of a current sub-feature map with a result of a previous summing operation, to obtain superimposed information associated with the current sub-feature map. In an example, the calculating of the output data may include concatenating the plurality of pieces of superimposed information. In an example, the calculating of the output data may include determining the output data based on the concatenated plurality of pieces of superimposed information.

In step S243, the image processing method 240 may include identifying a target patch based on the first filled image. In an embodiment, the target patch may correspond to at least a portion of the first target region.

According to an embodiment, the identifying of the target patch may include scaling down the first filled image based on a predetermined third size (e.g., 256×256), to obtain a second filled image including a second target region. In an example, the second target region may correspond to the first target region of the first filled image. According to an embodiment, the identifying of the target patch may include extracting the target patch from the second filled image based on at least one predetermined patch size (e.g., 16×16, 32×32). For example, the target patch may include at least a portion of the second target region.

In step S244, the image processing method 240 may include calculating a similarity value between the target patch and at least one patch related to the first filled image using a first artificial intelligence (AI) model (e.g., patch network). According to an embodiment, the first AI model may include each sub-network for each patch size (e.g., 32×32, 16×16). The calculating of the similarity value may include calculating the similarity value using a sub-network for a size of the target patch.

According to an embodiment, the calculating of the similarity value between the target patch and at least one patch may include tiling the target patch to generate a tile image comprising a plurality of tiles corresponding to the target patch. In an example, a size of the tile image may be determined based on a size of the second filled image. According to an embodiment, the calculating of the similarity value between the target patch and at least one patch may include inputting the tile image and the second filled image with the second target region masked to the first AI model. According to an embodiment, the calculating of the similarity value between the target patch and at least one patch may include acquiring output data of the first AI model including the similarity value between the target patch and at least one patch of the second filled image with the second target region masked.

In an example, the acquiring of the output data of the first AI model may include acquiring an attention scores map for the target patch. A value of each position in the attention scores map may indicated a similarity value between the target patch and a patch at the each position in the second filled image with the second target region masked. The position may include coordinate information in each image or each map. In an embodiment, the lower similarity value may indicate more similarity between each other. Alternatively, the higher similarity value may indicate more similarity between each other.

In step S245, the image processing method 240 may include determining a target residual patch corresponding to the target patch based on the similarity value. According to an embodiment, the determining of the target residual patch may include identifying a position with a lowest similarity value in the attention scores map. According to an embodiment, the determining of the target residual patch may include determining the target residual patch in the target image, based on the position with the lowest similarity value.

In step S246, the image processing method 240 may include generating a processing result image (e.g., final result, final ultra high-resolution result), based on the target residual patch. According to an embodiment, the generating of the processing result image may include generating a target residual image for the unknown region of the target image, based on the target residual patch. According to an embodiment, the generating of the processing result image may include generating the processing result image based on the target residual image and the first filled image (e.g., generated 512×512 result).

In an example, the generating of the target residual image for the unknown region may include generating a first residual image (e.g., pasted result in the unknown region, mask region residual image result) for the unknown region based on the target residual patch. In an example, the generating of the target residual image for the unknown region may include generating a second residual image (e.g., low-resolution residual image, low-resolution high frequency image) for the unknown region based on the first filled image. In an example, the generating of the target residual image for the unknown region may include generating a refined residual image (e.g., enhanced high-frequency information image) for the unknown region as the target residual image, based on the first residual image and the second residual image.

In an embodiment, the generating of the second residual image may include performing at least one of a scaling down operation, a scaling up operation or a subtract operation on the first filled image to generate a low resolution residual image as the second residual image.

In an example, the generating of the processing result image based on the target residual image and the first filled image may include scaling up the first filled image based on a size of the target image. In an example, the generating of the processing result image based on the target residual image and the first filled image may include adding the target residual image to the first filled image scaled up (e.g., generated coarse result, blurred image in original pixel size), to generate the processing result image.

According to an aspect of the disclosure, there is provided a non-transitory computer readable storage medium storing a program to be executable by at least one processor to perform an image processing method according to at least one of the above-described embodiments.

It should be understood that while the flowcharts of embodiments of the present disclosure indicate the individual operational steps by arrows, the order in which these steps are performed is not limited to the order indicated by the arrows. Unless explicitly stated herein, in some implementation scenes of embodiments of the present disclosure, the implementation steps in the respective flowcharts may be performed in other orders as desired. Moreover, some or all of the steps in each flowchart may comprise a plurality of sub-steps or a plurality of stages, based on actual implementation scenes. Some or all of these sub-steps or phases may be executed at the same moment, and each of these sub-steps or phases may further be executed separately at different moments. In scenes where the execution time is different, the order of execution of these sub-steps or stages may be flexibly configured according to the needs, and an embodiment of the present disclosure is not limited in this regard.

It should be noted that for those skilled in the art, other similar means of embodiment, based on the technical concept of the present disclosure, without departing from the technical concept of the present disclosure, also fall within the scope of protection of the embodiments of the present disclosure.

According to an aspect of the disclosure, an image processing method includes performing image extraction on an acquired first image to obtain a plurality of second images. The image processing method further includes determining target images associated with the plurality of second images in the acquired first image, based on image similarity values determined by a convolutional neural network. The image processing method further includes performing a first filling processing of the acquired first image, based on the plurality of second images and the target images.

In some embodiments, the performing of the image extraction may include acquiring a first image, that has been processed by a second filling processing, wherein the second filling processing may include determining, in response to an editing operation, a target region in an image to be filled, and performing the second filling processing of the target region by using image information included in the image to be filled, to obtain the acquired first image. The performing of the image extraction may further include performing the image extraction from the target region of the acquired first image to obtain the plurality of second images.

In some embodiments, the determining of the target region in the image to be filled may include determining, in response to the editing operation, the image to be filled based on the image before the editing operation. The determining of the target region in the image to be filled may further include identifying, as the target region, a region in the image to be filled that does not comprise the image information.

In some embodiments, the image processing method may further include cropping or scaling the image to be filled, based on a predetermined image area, before the performing of the second filling processing on the target region.

In some embodiments, the cropping or scaling of the image to be filled may include, when an area of the image to be filled is larger than the predetermined image area, cropping the image to be filled, and, when the area of the cropped image to be filled is larger than the predetermined image area, scaling down the area of the cropped image to be filled to the predetermined image area.

In some embodiments, the cropping of the image to be filled may include calculating a maximum connected component in a mask image corresponding to the image to be filled, and cropping the image to be filled based on a minimum bounding square corresponding to the maximum connected component, to obtain at least one cropped image to be filled.

In some embodiments, the performing of the second filling processing on the target region may include sequentially performing at least one down-sampling operation and at least one up-sampling operation on the image to be filled, to obtain the acquired first image. In such embodiments, the performing of each of the at least one down-sampling operation may include performing a dilated convolution operation on a feature map obtained by that down-sampling operation, based on a different dilation rate for each of the at least one down-sampling operation.

In some embodiments, the performing of the dilated convolution operation may include splitting the feature map obtained by the at least one down-sampling operation into at least one sub-feature map, based on a predetermined number of dilated convolutions. The performing of the dilated convolution operation may further include performing feature extraction from different sub-feature maps by using different dilation rates. The performing of the dilated convolution operation may further include determining an output of a dilated convolution, based on a feature extraction result of the different sub-feature maps.

In some embodiments, the determining of the output of the dilated convolution may include performing a summing operation for the feature extraction result of the different sub-feature maps to obtain a plurality of pieces of superimposed information. The determining of the output of the dilated convolution may further include concatenating the plurality of pieces of superimposed information. The determining of the output of the dilated convolution may further include determining the output of the dilated convolution, based on the concatenated plurality of pieces of superimposed information. In such embodiments, the summing operation may include summing the feature extraction result of a current sub-feature map with a result obtained from a previous summing operation, to obtain superimposed information associated with the current sub-feature map.

In some embodiments, the performing of the image extraction from the target region may include performing the image extraction from the target region of the acquired first image, based on a predetermined first image size and a predetermined image extraction order, to obtain the plurality of second images.

In some embodiments, the determining of the target images associated with the plurality of second images may include performing for each second image of the plurality of second images: tiling that second image to obtain a third image with an image size corresponding to the target region, calculating a similarity value of that second image relative to remaining second images of the plurality of second images, based on the third image, by the convolutional neural network, to obtain a similarity feature map, and determining a target position in the target region of a target image of the target images with a highest similarity to that second image, based on the similarity feature map. In such embodiments, the performing of the first filling processing of the acquired first image, based on the plurality of second images and the target images, may include filling that second image to the target position.

In some embodiments, the calculating of the similarity value of that second image may include transforming the third image, based on a predetermined second image size, to obtain a transformed third image, and down-sampling the transformed third image, based on a predetermined first image size and the predetermined second image size, to obtain a down-sampled third image. The predetermined first image size may be a size for extracting that second image from the target region of the acquired first image.

In some embodiments, the determining of the target images may include performing for each second image of the plurality of second images: tiling that second image to obtain a fourth image with an image size that matches a size of the acquired first image, and determining, a target image of the target images in the acquired first image with a highest similarity to the second image by the convolutional neural network, based on the fourth image. In such embodiments, the performing of the first filling processing of the acquired first image may include filling the target image to a corresponding position of that second image in the acquired first image.

In some embodiments, the image processing method may further include, after performing the first filling processing, acquiring fifth images corresponding to regions where the plurality of second images are located, based on the acquired first image, acquiring sixth images corresponding to the plurality of second images, from the acquired first image processed by the first filling processing, determining a target filled image, based on the fifth images and the sixth images, and determining an image obtained after the image processing, based on the target filled image and the acquired first image.

In some embodiments, the acquiring of the fifth images may include performing a scaling down operation and a scaling up operation on the acquired first image, to obtain a seventh image, determining an eighth image, based on the acquired first image and the seventh image, and acquiring the fifth images corresponding to the plurality of second images, based on the eighth image.

In some embodiments, the determining of the target filled image may include performing a convolution operation on the fifth images and the sixth images by an enhanced network, to obtain the target filled image. The enhanced network may include a down-sampling layer, a residual block layer, and an up-sampling layer connected sequentially. The down-sampling layer may include a plurality of first gated convolution layers connected sequentially. The residual block layer may include a plurality of second gated convolution layers connected sequentially. The plurality of second gated convolution layers may include a skip connection structure between each other. The up-sampling layer may include a plurality of third gated convolution layers connected sequentially. The plurality of third gated convolution layers may be connected to the plurality of first gated convolution layers in corresponding levels.

According to an aspect of the disclosure, an electronic device includes a memory storing one or more instructions, and at least one processor communicatively coupled to the memory. The processor configured to execute the one or more instructions to perform image extraction on an acquired first image to obtain a plurality of second images. The processor is further configured to execute the one or more instructions to determine target images associated with the plurality of second images in the acquired first image, based on image similarity values determined by a convolutional neural network. The processor is further configured to execute the one or more instructions to perform a first filling processing of the acquired first image, based on the plurality of second images and the target images.

In some embodiments, the processor is further configured to execute the one or more instructions to acquire a first image, that has been processed by a second filling processing, wherein the second filling processing may include further instructions to determine, in response to an editing operation, a target region in an image to be filled, and to perform the second filling processing of the target region by using image information included in the image to be filled, to obtain the acquired first image. In such embodiments, the processor is further configured to execute the one or more instructions to perform the image extraction from the target region of the acquired first image to obtain the plurality of second images.

According to an aspect of the disclosure, a computer readable storage medium is configured to store computer instructions which allow a computer, when the computer instructions are operated in the computer, to perform image extraction on an acquired first image to obtain a plurality of second images, determine target images associated with the plurality of second images in the acquired first image, based on image similarity values determined by a convolutional neural network, and perform a first filling processing of the acquired first image, based on the plurality of second images and the target images.

In some embodiments, the computer instructions further allow the computer to acquire a first image, that has been processed by a second filling processing, wherein the second filling processing may include further instructions to determine, in response to an editing operation, a target region in an image to be filled, and to perform the second filling processing of the target region by using image information included in the image to be filled, to obtain the acquired first image, and perform the image extraction from the target region of the acquired first image to obtain the plurality of second images.

The present disclosure provides an image processing method, an apparatus, an electronic device, a computer-readable storage medium, and a computer program product. Specifically, the present disclosure is related to a first image requiring image processing. After acquiring the first image, an image extraction on the acquired first image is firstly performed to obtain a plurality of second images; and target images associated with the second images are determined in the first image, based on an image similarity value determined by a convolutional neural network; and a first filling processing of the first image is performed based on the second images and the target images. The implementation of the solution of the present disclosure may perform image filling based on the image information included in the first image. Such that the second image corresponds to a part of the first image to be subjected to the first filling processing, and a filling of the first image may be achieved based on the target image related to the second image. The processing of this solution may facilitate a faster understanding of the filling position, with reduced computational complexity and resource usage (e.g., processing resources, memory resources) when compared to related image processing operations. Moreover, the determination of similarity is calculated by using a convolutional neural network. The computational amount of similarity is related to the parameters of the network, but not related to the size of the processed image, which facilitates reducing the computational complexity and improving the performance of image processing.

What is claimed is:

1. An image processing method, comprising:

acquiring a target image based on an editing operation on an original image, wherein the target image comprises an unknown region formed by the editing operation;

performing a filling processing operation on the target image to obtain a filled image comprising a target region, wherein the target region corresponds to the unknown region;

identifying a target image patch comprising at least a portion of the target region in the filled image;

tiling the target image patch to generate a tile image with a predetermined third size comprising a plurality of tiles corresponding to the target image patch;

obtaining a similarity value between the target image patch and at least one image patch from the filled image by inputting the tile image into a first artificial intelligence (AI) model;

determining a residual patch associated with an image patch among the at least one image patch as a target residual patch associated with the target image patch based on the similarity value, wherein the residual patch comprises high frequency texture information associated with the image patch; and generating a processing result image based on the target residual patch and the filled image.

2. The image processing method of claim 1, wherein the acquiring of the target image comprises:

acquiring an edited image by the editing operation on the original image; and in case that a size of the edited image is larger than a predetermined first size, cropping the edited image to acquire a cropped image as the target image.

3. The image processing method of claim 2, wherein the cropping of the edited image comprises:

calculating at least one maximum connected component in a mask image corresponding to the edited image; and cropping the edited image based on at least one minimum bounding square corresponding to the at least one maximum connected component, to obtain at least one cropped image.

4. The image processing method of claim 1, wherein the performing of the filling processing operation on the target image comprises:

in case that a size of the target image is larger than a predetermined second size, scaling down the target image based on the predetermined second size; and generating the filled image by filling the unknown region of the target image scaled down, using a second AI model for image generation.

5. The image processing method of claim 1, wherein the performing of the filling processing operation on the target image comprises:

generating image data of the target region corresponding to the unknown region based on the target image using a second AI model for image generation to obtain the filled image.

6. The image processing method of claim 5, wherein the second AI model comprises at least one down-sampling operation, at least one dilated convolution operation and at least one up-sampling operation.

7. The image processing method of claim 6, wherein each of the at least one down-sampling operation is configured to extract a feature map from input data, and each of the at least one dilated convolution operation is configured to:

split an input feature map into at least one sub-feature map, based on a predetermined number of dilated convolutions;

perform feature extraction from each of the at least one sub-feature map using each dilation rate corresponding to the each of the at least one sub-feature map; and calculate output data based on a feature extraction result of the each of the at least one sub-feature map.

8. The image processing method of claim 7, wherein the calculating of the output data comprises:

performing at least one summing operation on the feature extraction result of the each of the at least one sub-feature map to obtain a plurality of pieces of superimposed information;

concatenating the plurality of pieces of superimposed information; and determining the output data based on the concatenated plurality of pieces of superimposed information, and wherein the at least one summing operation comprises summing a feature extraction result of a current sub-feature map with a result of a previous summing operation, to obtain superimposed information associated with the current sub-feature map.

9. The image processing method of claim 1, wherein the first AI model includes each sub-network for each image patch size, and wherein the obtaining of the similarity value comprises: obtaining the similarity value using a sub-network for a size of the target image patch.

10. The image processing method of claim 1, wherein the identifying of the target image patch comprises:

scaling down the filled image based on the predetermined third size, to obtain a scaled-down filled image comprising a scaled-down target region, wherein the scaled-down target region of the scaled-down filled image corresponds to the target region of the filled image; and extracting the target image patch from the scaled-down filled image based on at least one predetermined patch size, wherein the target image patch comprises at least a portion of the scaled-down target region.

11. The image processing method of claim 10, wherein the obtaining of the similarity value between the target image patch and the at least one image patch comprises:

inputting the tile image and the scaled-down filled image with the scaled-down target region masked, into the first AI model; and acquiring output data of the first AI model including the similarity value between the target image patch and the at least one image patch, wherein the at least one image patch comprises at least a portion of the scaled-down filled image with the scaled-down target region masked.

12. The image processing method of claim 11, wherein the acquiring of the output data of the first AI model comprises:

acquiring an attention scores map for the target image patch, wherein a value of each position in the attention scores map indicates a similarity value between the target image patch and an image patch at the each position in the scaled-down filled image with the scaled-down target region masked.

13. The image processing method of claim 12, wherein the determining of the residual patch associated with the image patch among the at least one image patch as the target residual patch comprises:

identifying a position with a highest similarity value in the attention scores map; and determining the residual patch at the position with the highest similarity value in the target image as the target residual patch.

14. The image processing method of claim 1, wherein the generating of the processing result image comprises:

generating a target residual image for the unknown region of the target image, based on the target residual patch; and generating the processing result image based on the target residual image and the filled image.

15. The image processing method of claim 14, wherein the generating of the target residual image for the unknown region comprises:

generating a first residual image for the unknown region based on the target residual patch;

generating a second residual image for the unknown region based on the filled image; and generating the target residual image, based on the first residual image and the second residual image.

16. The image processing method of claim 15, wherein the generating of the second residual image comprises:

performing at least one of a scaling down operation, a scaling up operation or a subtract operation on the filled image to generate a low resolution residual image as the second residual image.

17. The image processing method of claim 14, wherein the generating of the processing result image based on the target residual image and the filled image comprises:

scaling up the filled image based on a size of the target image; and adding the target residual image to the filled image scaled up to generate the processing result image.

18. An electronic device, comprising:

a memory storing one or more instructions; and at least one processor communicatively coupled to the memory, and configured to execute the one or more instructions to:

acquire a target image based on an editing operation on an original image, wherein the target image comprises an unknown region formed by the editing operation;

perform a filling processing operation on the target image to obtain a filled image comprising a target region, wherein the target region corresponds to the unknown region;

identify a target image patch comprising at least a portion of the target region in the filled image;

tile the target image patch to generate a tile image with a predetermined third size comprising a plurality of tiles corresponding to the target image patch;

obtain a similarity value between the target image patch and at least one image patch from the filled image by inputting the tile image into a first artificial intelligence (AI) model;

determine a residual patch associated with an image patch among the at least one image patch as a target residual patch associated with the target image patch based on the similarity value, wherein the residual patch comprises high frequency texture information associated with the image patch; and generate a processing result image based on the target residual patch and the filled image.

19. The electronic device of claim 18, wherein the at least one processor is further configured to execute the one or more instructions to:

in case that a size of the target image is larger than a predetermined second size, scale down the target image based on the predetermined second size; and generate the filled image by filling the unknown region of the target image scaled down, using a second AI model for image generation.

20. A non-transitory computer readable storage medium storing a program to be executable by at least one processor to perform an image processing method, wherein the image processing method comprises:

acquiring a target image based on an editing operation on an original image, wherein the target image comprises an unknown region formed by the editing operation;

performing a filling processing operation on the target image to obtain a filled image comprising a target region, wherein the target region corresponds to the unknown region;

identifying a target image patch comprising at least a portion of the target region in the filled image;

tiling the target image patch to generate a tile image with a predetermined third size comprising a plurality of tiles corresponding to the target image patch;

obtaining a similarity value between the target image patch and at least one image patch from the filled image by inputting the tile image into a first artificial intelligence (AI) model;

determining a residual patch associated with an image patch among the at least one image patch as a target residual patch associated with the target image patch based on the similarity value, wherein the residual patch comprises high frequency texture information associated with the image patch; and generating a processing result image based on the target residual patch and the filled image.

* * * * *